US012726931B2

(12) United States Patent
Zach et al.

(10) Patent No.: US 12,726,931 B2

(45) Date of Patent: Sep. 1, 2026

(54) POWER AND TIME DELAY PROFILE REPORT FOR DEVICE POSITIONING

(71) Applicant: QUALCOMM Incorporated, San Diego, CA (US)

(72) Inventors: Noam Zach, Kiryat Ono (IL); Guy Wolf, Rosh Haayin (IL); Assaf Touboul, Netanya (IL); Shay Landis, Hod Hasharon (IL); Sharon Levy, Binyamina (IL); Michael Levitsky, Rehovot (IL); Peer Berger, Hod Hasharon (IL); David Yunusov, Holon (IL)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 18/003,034

(22) PCT Filed: Aug. 17, 2021

(86) PCT No.: PCT/US2021/046377

§ 371 (c)(1),
(2) Date: Dec. 22, 2022

(87) PCT Pub. No.: WO2022/046474

PCT Pub. Date: Mar. 3, 2022

(65) Prior Publication Data

US 2023/0262643 A1 Aug. 17, 2023

(30) Foreign Application Priority Data

Aug. 23, 2020 (IL) ........................................ 276869

(51) Int. Cl.

| | |
|---|---|
| ***H04W 64/00*** | (2009.01) |
| ***H04L 5/00*** | (2006.01) |
| ***H04W 24/10*** | (2009.01) |

(52) U.S. Cl.

CPC .......... *H04W 64/00* (2013.01); *H04L 5/0051* (2013.01); *H04W 24/10* (2013.01)

(58) Field of Classification Search

CPC ..... H04W 24/08; H04W 24/10; H04W 76/19; H04W 76/27; H04W 76/309;

(Continued)

(56) References Cited

U.S. PATENT DOCUMENTS 8,483,662 B2 * 7/2013 Kato .................... H04M 1/667 455/411

8,725,167 B2 * 5/2014 Siomina ............... H04L 5/0062 455/456.2

(Continued)

FOREIGN PATENT DOCUMENTS

CN 110140299 A 8/2019

CN 110839208 A 2/2020

(Continued)

OTHER PUBLICATIONS

M. Elsaadany, A. Ali and W. Hamouda, "Cellular LTE-A Technologies for the Future Internet-of-Things: Physical Layer Features and Challenges," in IEEE Communications Surveys & Tutorials, vol. 19, No. 4, pp. 2544-2572, Fourthquarter 2017, doi: 10.1109/COMST.2017.2728013. (Year: 2017).*

(Continued)

*Primary Examiner* — William D Cumming

(74) *Attorney, Agent, or Firm* — Weaver Austin Villeneuve & Sampson LLP

(57) ABSTRACT

Techniques are provided for reporting, by a device, positioning-related information to a network entity. In an example, the device receives signaling information of the network entity. The signaling information indicates one or more parameters for a report on a reference signal that is transmitted by a base station. The device also receives (Continued)

multiple propagations of the reference signal upon a transmission of the reference signal by the base station. Based on the signaling information, the device generates the report, where the report comprises a power and a time delay per propagation of the reference signal. The device transmits the report to the network entity, where a position of the device is determined by the network entity based on the report.

26 Claims, 16 Drawing Sheets

(58) Field of Classification Search
CPC ............... H04W 80/02; H04W 36/085; H04W 36/0079; H04W 16/28; H04W 4/00; H04W 76/18; H04M 15/55
USPC ........................ 455/456.1, 414.1, 411, 456.2
See application file for complete search history.

(56) References Cited

U.S. PATENT DOCUMENTS

| | | | | |
|---|---|---|---|---|
| 9,380,594 | B1 * | 6/2016 | Malmirchegini | H04W 24/08 |
| 9,397,769 | B2 | 7/2016 | Mirbagheri et al. | |
| 10,609,610 | B2 * | 3/2020 | Park | H04W 16/28 |
| 10,609,611 | B2 * | 3/2020 | Park | H04W 16/28 |
| 11,089,525 | B2 * | 8/2021 | Park | H04W 16/28 |
| 11,101,862 | B2 * | 8/2021 | Venugopal | H04B 7/0626 |
| 11,102,688 | B2 * | 8/2021 | Park | H04W 16/28 |
| 11,129,070 | B2 * | 9/2021 | Park | H04W 16/28 |
| 11,223,985 | B2 * | 1/2022 | Park | H04W 16/28 |
| 11,405,088 | B2 * | 8/2022 | Bai | H04B 7/0632 |
| 11,533,700 | B2 * | 12/2022 | Duan | G01S 5/0205 |
| 11,533,852 | B2 * | 12/2022 | Müller | G01G 19/021 |
| 11,658,753 | B2 * | 5/2023 | Huang | H04L 5/0094 455/456.1 |
| 11,681,010 | B2 * | 6/2023 | Sosnin | G01S 5/0273 342/450 |
| 11,818,683 | B2 * | 11/2023 | Duan | G01S 5/0205 |
| 11,856,630 | B2 * | 12/2023 | Kim | H04L 1/1896 |
| 11,963,150 | B2 * | 4/2024 | Kumar | H04L 5/0048 |
| 12,058,706 | B2 * | 8/2024 | Michalopoulos | H04B 7/086 |
| 12,101,646 | B2 * | 9/2024 | Yu | H04L 5/0051 |
| 2005/0152436 | A1 | 7/2005 | Reial | |
| 2007/0126626 | A1 * | 6/2007 | Kung | G01S 5/0036 342/357.66 |
| 2010/0124910 | A1 * | 5/2010 | Eich | H04M 15/55 455/414.1 |
| 2011/0263226 | A1 * | 10/2011 | Kato | H04W 4/00 455/411 |
| 2013/0023286 | A1 | 1/2013 | Soma et al. | |
| 2019/0132066 | A1 * | 5/2019 | Park | H04W 16/28 |
| 2019/0132777 | A1 * | 5/2019 | Park | H04W 16/28 |
| 2019/0132778 | A1 * | 5/2019 | Park | H04W 16/28 |
| 2019/0141592 | A1 * | 5/2019 | Park | H04W 16/28 |
| 2020/0229057 | A1 * | 7/2020 | Park | H04W 16/28 |
| 2020/0229058 | A1 * | 7/2020 | Park | H04W 16/28 |
| 2020/0259545 | A1 * | 8/2020 | Bai | H04B 7/063 |
| 2020/0304186 | A1 * | 9/2020 | Venugopal | H04B 7/088 |
| 2022/0030659 | A1 * | 1/2022 | Kim | H04W 28/06 |
| 2022/0113365 | A1 * | 4/2022 | Sosnin | G01S 5/02 |
| 2023/0217265 | A1 * | 7/2023 | Huang | H04W 24/10 370/329 |
| 2023/0262643 | A1 * | 8/2023 | Zach | H04W 24/10 455/456.1 |
| 2024/0056856 | A1 * | 2/2024 | Lin | H04W 24/10 |
| 2024/0129991 | A1 * | 4/2024 | Kim | H04W 24/08 |

FOREIGN PATENT DOCUMENTS

| | | | | | |
|---|---|---|---|---|---|
| EP | 3321709 | A1 | | 5/2018 | |
| JP | 2007536761 | A | | 12/2007 | |
| JP | 2011223081 | A | * | 11/2011 | H04W 52/0206 |
| JP | 2019536024 | A | | 12/2019 | |
| KR | 20010047137 | A | * | 6/2001 | |
| KR | 20220113365 | A | * | 8/2022 | C07F 9/301 |
| KR | 102515430 | B1 | * | 3/2023 | C07F 9/32 |
| TW | 1507708 | B | * | 11/2015 | G01S 5/0268 |
| WO | 2016085614 | | | 6/2016 | |
| WO | 2016099546 | A1 | | 6/2016 | |
| WO | 2019196121 | A1 | | 10/2019 | |
| WO | WO-2020028517 | A1 | * | 2/2020 | G01S 5/10 |
| WO | WO-2020069083 | A1 | | 4/2020 | |

OTHER PUBLICATIONS

Fischer S., "Observed Time Difference of Arrival (OTDOA) Positioning in 3GPP LTE", Qualcomm Technologies Inc, Jun. 6, 2014, XP055284784, pp. 1-62, Figures 6-4, Section 6.3 LPP Procedures.
International Search Report and Written Opinion—PCT/US2021/046377—ISA/EPO—Nov. 26, 2021.

* cited by examiner

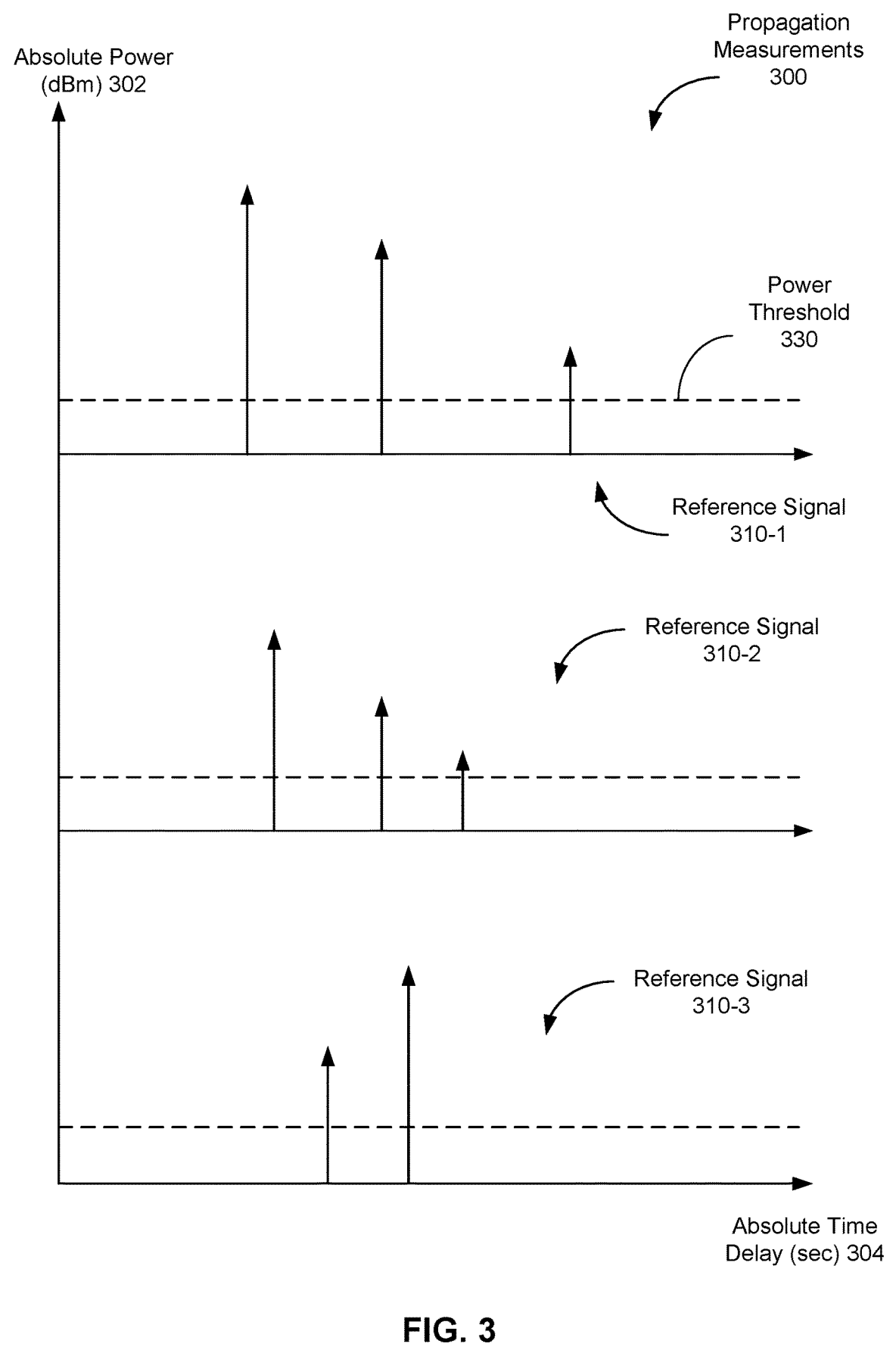

Propagation Measurements 300

Absolute Power (dBm) 302

Power Threshold 330

Reference Signal 310-1

Reference Signal 310-2

Reference Signal 310-3

Absolute Time Delay (sec) 304

FIG. 3

POWER AND TIME DELAY PROFILE REPORT FOR DEVICE POSITIONING

RELATED APPLICATIONS

This application is a National Phase entry of International Application No. PCT/US2021/046377, filed Aug. 17, 2021, entitled "POWER AND TIME DELAY PROFILE REPORT FOR DEVICE POSITIONING" which claims the benefit of Israel Application No. 276869, filed Aug. 23, 2020, entitled "POWER AND TIME DELAY PROFILE REPORT FOR DEVICE POSITIONING", both of which are assigned to the assignee hereof, and incorporated herein in their entirety by reference.

BACKGROUND

Determining the location of a mobile electronic device using a cellular network may use signaling between the device and base stations of the cellular network. According to some techniques, Round-Trip-Time (RTT) measurements may be made to determine distances between the device and the base stations from which the location of the device may be determined. But these measurements can suffer inaccuracy due to multipath propagation.

BRIEF SUMMARY

Techniques described herein provide for positioning a device by using a power delay profile report. In an example, a device sends a report indicating a power and time delay profile per reference signal received by the device from a base station. The report can be received by a network entity, such as the base station or a location server. In turn, the network entity selects a particular reference signal, if any, per base station and estimates a location of the device based on RTT measurements on the selected reference signal. Further, the location estimation can involve other parameters, such as transmit beam information and sensor information (e.g., camera information and radar information). The parameters and the report are input to a fusion algorithm that generates the location estimation.

An example method for reporting positioning-related information to a network entity, according to this disclosure, may comprise receiving signaling information indicating one or more parameters for reporting on reference signals, wherein the one or more parameters identify one or more base stations. The method also may comprise determining, based on the signaling information, a power and time delay profile for one or more reference signals received from the one or more base stations, wherein the power and time delay profile for each of the one or more reference signals comprises power and time delay information for each of one or more propagation signals corresponding to the respective reference signal. The method also may comprise sending a report to the network entity, wherein the report includes the power and time delay profile.

An example method for positioning a device, according to this disclosure, may comprise sending signaling information to the device, wherein the signaling information indicates one or more parameters for reporting on reference signals. The method also may comprise receiving a report from the device based on the signaling information, wherein the report comprises a power and time delay profile for one or more reference signals received by the device from one or more base stations, and wherein the power and time delay profile for each of the one or more reference signals comprises power and time delay information for each of one or more propagation signals corresponding to the respective reference signal. The method also may comprise determining a position of the device based on the report.

An example device for reporting positioning-related information to a network entity, according to this disclosure, may comprise a transceiver, one or more memories, one or more processors communicatively coupled with the transceiver and the one or more memories, the one or more processors configured to receive signaling information indicating one or more parameters for reporting on reference signals, wherein the one or more parameters identify one or more base stations. The one or more processing units further may be configured to determine, based on the signaling information, a power and time delay profile for one or more reference signals received via the transceiver from the one or more base stations, wherein the power and time delay profile for each of the one or more reference signals comprises power and time delay information for each of one or more propagation signals corresponding to the respective reference signal. The one or more processing units further may be configured to send a report to the network entity via the transceiver, wherein the report includes the power and time delay profile.

An example network entity for positioning a device, according to this disclosure, may comprise a transceiver, one or more memories, one or more processors communicatively coupled with the transceiver and the one or more memories, the one or more processors configured to send signaling information to the device via the transceiver, wherein the signaling information indicates one or more parameters for reporting on reference signals. The one or more processing units further may be configured to receive a report from the device based on the signaling information, wherein the report comprises a power and time delay profile for one or more reference signals received by the device from one or more base stations, and wherein the power and time delay profile for each of the one or more reference signals comprises power and time delay information for each of one or more propagation signals corresponding to the respective reference signal. The one or more processing units further may be configured to determine a position of the device based on the report.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 3 illustrates an example of a power and time delay profile, according to an embodiment.

Figure 1:
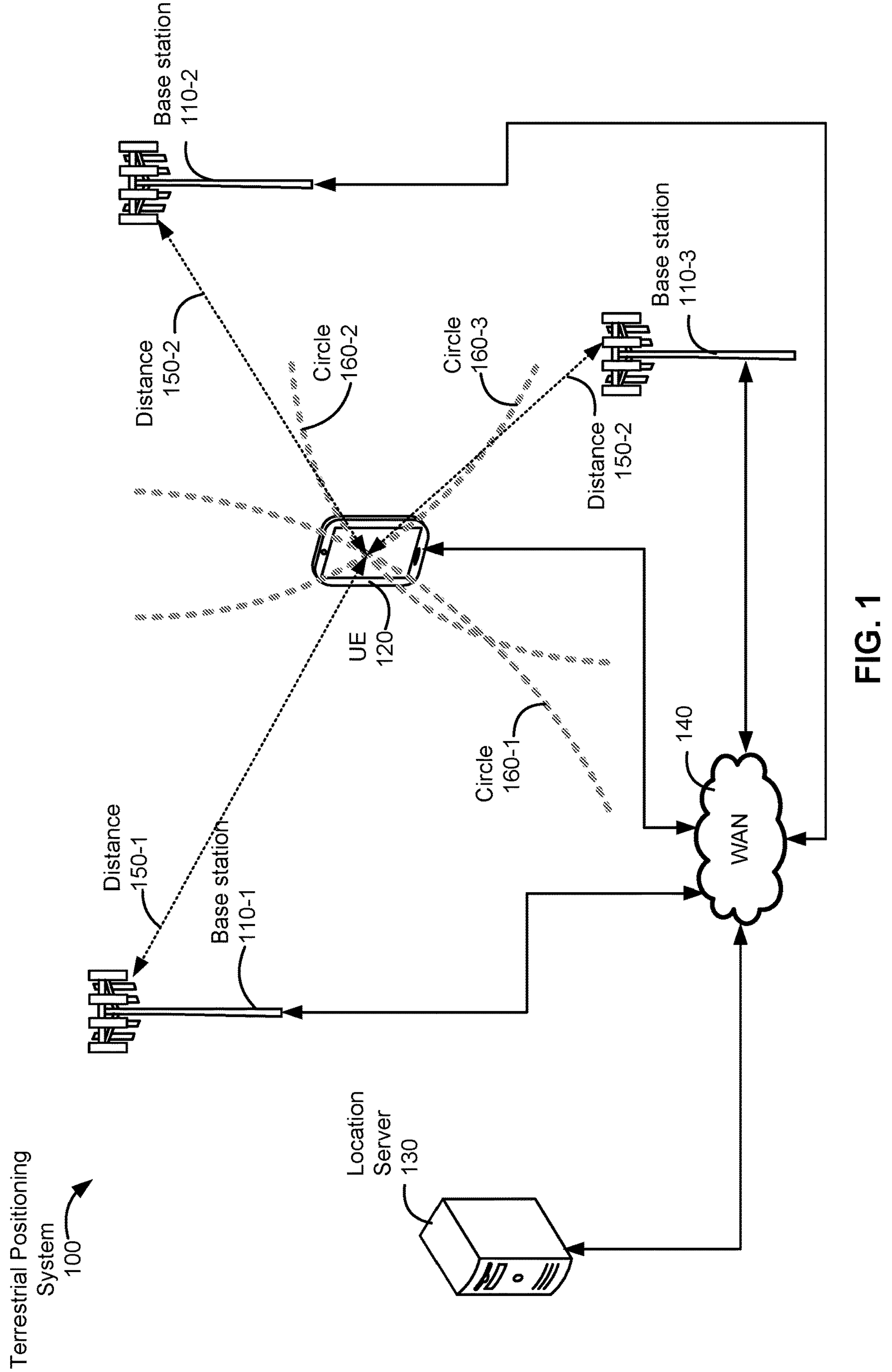
FIG. 1 is a diagram illustrating an example of a terrestrial positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3, etc. When referring to such an element using only the first number, any instance of the element is to be understood (e.g., element 110 in the previous example would refer to elements 110-1, 110-2, and 110-3).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Additionally, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

In the interest of clarity of explanation, various embodiments of the present disclosure are described in connection with a UE, such as a mobile phone. However, the embodiments are not limited as such and similarly apply to any other types of devices. Generally, a device may connect to a cellular network and reference signals can be transmitted to the device from the cellular network. Measurements on the reference signals are performed to determine a position of the device.

Fifth Generation (5G) New Radio (NR) is a wireless radio frequency (RF) interface undergoing standardization by the 3rd Generation Partnership Project (3GPP). 5G NR is poised to offer enhanced functionality over previous generation (Long-Term Evolution (LTE)) technologies, such as significantly faster and more responsive mobile broadband, enhance conductivity through IoT devices, and more. Additionally, 5G NR enables new positioning techniques for UEs, including Angle of Arrival (AoA)/Angle of Departure (AoD) positioning, UE-based positioning, and multi-cell Round-Trip-Time (RTT) positioning. With regard to RTT positioning, this involves taking RTT measurements between the UE and multiple base stations.

FIG. 1 is a diagram illustrating an example of a terrestrial positioning system 100, according to an embodiment. Here, the terrestrial positioning system 100 comprises multiple cellular transceivers, or base stations 110-1, 110-2, and 110-3 (generically and collectively referred to herein as base stations 110), which are used to determine the location (e.g., in geographical coordinates) of a UE 120. The base stations 110 and/or the UE 120 both may be communicatively coupled with a location server 130 via a Wide Area Network (WAN) 140, which may comprise a network of the cellular carrier, as well as other data communication networks, as discussed in more detail below. (Solid arrows between components indicate communication links.) Although the UE 120 may be communicatively coupled with the WAN 140 via wireless communication with one or more of the base stations 110, the UE 120 may have an additional or alternative communication link to the WAN 140, as illustrated.

It should be noted that FIG. 1 provides a generalized illustration of various components, any or all of which may be utilized as appropriate, and each of which may be duplicated or omitted as necessary. Specifically, although one UE 120 is illustrated, it will be understood that many UEs (e.g., hundreds, thousands, millions, etc.) may utilize the terrestrial positioning system 100. Similarly, the terrestrial positioning system 100 may include a larger or smaller number base stations 110, location servers 130, and/or other components. The illustrated communication links that communicatively connect the various components in the terrestrial positioning system 100 include data and signaling connections which may include additional (intermediary) components, direct or indirect physical (wired) and/or wireless connections, and/or additional networks. Furthermore, components may be rearranged, combined, separated, substituted, and/or omitted, depending on desired functionality.

The UE 120, as used herein, may be an electronic device and may be referred to as a device, a mobile device, a wireless device, a mobile terminal, a terminal, a wireless terminal, a mobile station (MS), a Secure User Plane Location (SUPL) Enabled Terminal (SET), or by some other name. Moreover, UE 120 may correspond to a cellphone, smartphone, laptop, tablet, personal data assistant (PDA), wearable device (e.g., smart watch., tracking device or some other portable or moveable device). In some cases, a UE 120 may be part of some other entity—e.g. may be a chipset supporting a modem that is integrated into some larger mobile entity such as a vehicle, drone, package, shipment, robotic device etc. Typically, although not necessarily, the UE 120 may support wireless communication using one or more Radio Access Technologies (RATs) (e.g., in addition to 5G NR), such as GSM, CDMA, W-CDMA, LTE, HRPD, IEEE 802.11 Wi-Fi, Bluetooth® (BT), Worldwide Interoperability for Microwave Access (WiMAX), etc. The UE 120 may also support wireless communication using a Wireless Local Area Network (WLAN) which may connect to other networks (e.g. the Internet). The WAN 140 may comprise such wireless communication networks and/or technologies.

The UE 120 may include a single entity or may include multiple entities such as in a personal area network where a user may employ audio, video and/or data I/O devices and/or body sensors and a separate wireline or wireless modem. An estimate of a location of the UE 120 may be referred to as a location, location estimate, location fix, fix, position, position estimate or position fix (such terms are used herein interchangeably), and may be geodetic, thus providing location coordinates for the UE 120 (e.g., latitude and longitude) which may or may not include an altitude component (e.g., height above sea level, height above or depth below ground level, floor level or basement level). Alternatively, a location of the UE 120 may be expressed as a civic location (e.g., as a postal address or the designation of some point or small area in a building such as a particular room or floor). A location of the UE 120 may also be expressed as an area or volume (defined either geodetically or in civic form) within which the UE 120 is expected to be located with some probability or confidence level (e.g., 67%, 165%, etc.) A location of the UE 120 may further be a relative location comprising, for example, a distance and direction or relative X, Y (and, optionally, Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

As noted, depending on desired functionality, the WAN 140 may comprise any of a variety of wireless and/or wireline communication networks. The WAN 140 can, for example, comprise any combination of public and/or private networks, local and/or wide-area networks, and the like. Furthermore, the WAN 140 may utilize one or more wired and/or wireless communication technologies. In some embodiments, the WAN 140 may comprise a cellular or other mobile network, a WLAN, a Wireless Wide-Area Network (WWAN), and/or the Internet, for example. Particular examples of a WAN 140 include 5G NR network, an LTE network, a Wi-Fi WLAN and the like. WAN 140 may also include more than one network and/or network type.

Base stations 110 may comprise nodes in a cellular network, which may allow the UE 120 to communicate wirelessly with other devices linked to the WAN 140. The base stations 110 may have known locations, and may therefore be used for positioning as described herein. As described in further detail below, techniques are not necessarily limited to fixed base stations (i.e., base stations having a fixed position), but may also include mobile base stations and even other UEs 120. For 5G NR, the base stations 110 may comprise a next-generation Node B (gNB). A WAN 140 comprising additional or alternative RATs may include base stations 110 comprising a node B, an Evolved Node B (eNodeB or eNB), a base transceiver station (BTS), a radio base station (RBS), an NR NodeB (gNB), a Next Generation eNB (ng-eNB), a Wi-Fi AP, and/or a Bluetooth® AP. Thus, UE 120 can send and receive information with network-connected devices, such as location server 130, by accessing the WAN 140. And, as noted, the UE 120 may access the WAN 140 via a base station 110. Base stations 110 and/or base station antennas may be referred to as Transmission Reception Points (TRPs).

The location server 130 may comprise a server and/or other computing device configured to determine an estimated location of UE 120 and/or provide data (e.g., "assistance data") to UE 120 to facilitate the location determination. According to some embodiments, location server 130 may comprise a Secure User Plane Location (SUPL) Location Platform (SLP), which may support the SUPL user plane (UP) location solution defined by the Open Mobile Alliance (OMA) and may support location services for UE 120 based on subscription information for UE 120 stored in location server 130. The location server 130 may also comprise an Enhanced Serving Mobile Location Center (E-SMLC) that supports location of UE 120 using a control plane (CP) location solution for LTE radio access by UE 120. The location server 130 may further comprise a Location Management Function (LMF) that supports location of UE 120 using a control plane (CP) location solution for 5G or NR radio access by UE 120. In a CP location solution, signaling to control and manage the location of UE 120 may be exchanged between elements of WAN 140 and with UE 120 using existing network interfaces and protocols and as signaling from the perspective of WAN 140. In a UP location solution, signaling to control and manage the location of UE 120 may be exchanged between location server 130 and UE 120 as data (e.g. data transported using the Internet Protocol (IP) and/or Transmission Control Protocol (TCP)) from the perspective of WAN 140.

It can be further noted that, in some embodiments of a terrestrial positioning system 100, the location server 130 may be executed by and/or incorporated into the UE 120 itself. That is, in the embodiments described herein, the functionality of the location server 130 may be performed by the UE 120. In such instances, communication between the UE and location server may therefore occur between hardware and/or software components of the UE 120. Similarly, the functions of the location server 130 described herein may be performed by a base station 110 or other device communicatively coupled to the terrestrial positioning system 100.

Additionally, positioning of the UE 120 can be "UE-based" or "network-based." UE-based positioning comprises the UE 120 determining its own location, which may be facilitated by information provided to the UE 120 by the network (e.g., the location server 130 and/or base stations 110). Network-based positioning comprises the network (e.g., the location server 130) determining the location of the UE, which may be facilitated by information provided to the network by the UE 120. The techniques for RTT-based positioning provided herein may apply to either UE-based or network-based positioning. For example, for UE-based positioning, RTT measurements may be initiated by and/or communicated to the UE 120, which, if provided the location of the base stations 110 from which RTT measurements were taken, can determine its own location. For network-based positioning, RTT measurements may be initiated by and/or communicated to one or more base stations 110, which may send the measurements to the location server 130, which can then determine the location of the UE 120.

The terrestrial positioning system 100 can determine the location of the UE 120 by exploiting both downlink (DL) information transmitted by base stations 110 and uplink (UL) information transmitted by the UE 120. As explained in more detail below, certain positioning methods can use RTT to determine the location of the UE 120 by determining one or more distances 150 from base stations 110, then using multilateration or similar algorithms to determine the position of the UE 120. In multilateration, for example, distances 150-1, 150-2, and 150-3 trace respective circles 160-1, 160-2, and 160-3 (only portions of which are shown in FIG. 1), and the location of the UE 120 may be determined as the intersection of these circles 160. Alternative positioning methods may use a combination of distance information from one or more RTT measurements with angle information (e.g., AoA, AoD). Positioning methods using RTT measurements with angle information may be capable of determining a position of the UE 120 using a single base station 110.

Figure 2:
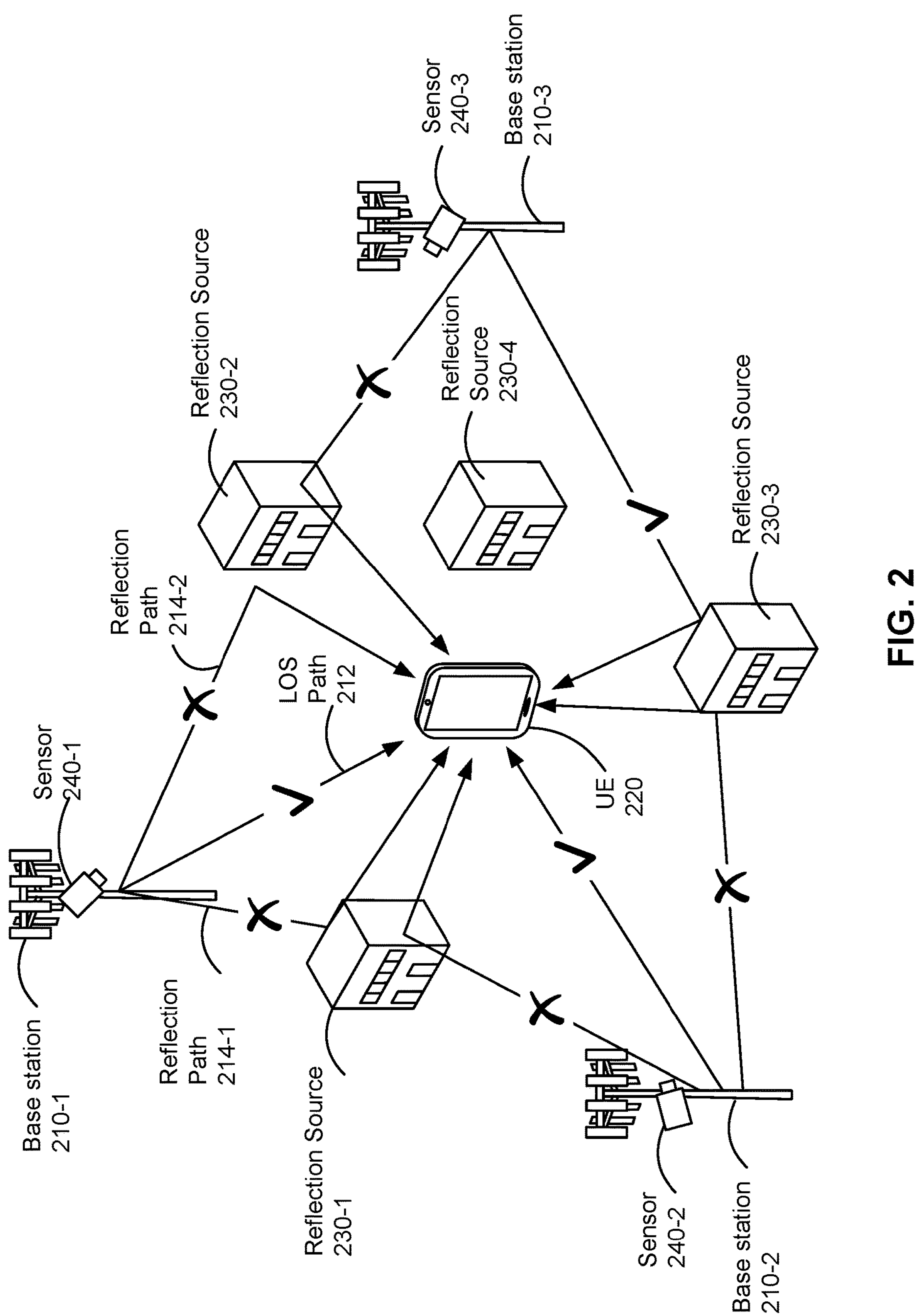
FIG. 2 is a multipath diagram illustrating an example of propagations of reference signals, according to an embodiment.

FIG. 2 is a multipath diagram illustrating an example of propagations of reference signals, according to an embodiment. In particular, in this example, a plurality of base stations 210 are in communication with a UE 220. Each one of the base stations 210 sends a reference signal to the UE 220 with which RTT measurements may be made. RTT measurements are performed by the UE 220 on the reference signals to determine a location of the UE 220. However, given different physical objects present in the environment, multipath propagation may result, in which a single reference signal transmitted by a base station can propagate along multiple paths. As used herein, the term "propagation signal" refers to portion of a signal that propagates along a particular propagation path. Thus, due to multipath propagation, the UE 210 may receive multiple propagation signals resulting from different portions of a single reference signal propagating along different respective propagation paths. In other words, a propagation signal is a reference signal received from a base station along a particular propagation path. The UE 210 can receive multiple propagation signals from a base station, where these propagation signals correspond to a same transmission of a reference signal by the base station, and where each of the propagation signals is received along a different propagation path. One propagation path can correspond to a line of sight transmission from the base station to the UE 210 and results in the UE 210 receiving a first propagation signal (or, equivalently, a first reference signal) from the base station. Another propagation path can correspond to a reflection path, where the UE 210 receives a second propagation signal (or, equivalently, a second reference signal) that is a reflection of the first reference signal by an object between the UE 210 and the base station. Multipath propagation can degrade the accuracy of the UE positioning based on RTT measurements. By selecting a particular propagation signal (e.g., one corresponding to a line of sight transmission of the reference signal, rather than a reflected transmission), the accuracy can be improved in the multipath environment.

In the illustration of FIG. 2, three base stations 210-1, 210-2, and 210-3 are in communications with the UE 220. Four reflection sources 230-1, 230-2, 230-3, and 230-4 can cause reflections of transmitted reference signals. A source from which a propagation signal is received by the UE 220 can be referred to as a tap, where the propagation signal is the portion of the reference signal propagating along a line of sight path or a reflected reference signal along a non-line of sight path. Although FIG. 2 illustrates a physical environment that includes a particular number of base stations and reflection sources, other arrangements of the physical environment are possible (e.g., the physical environment may include a different number of base stations and/or reflection sources).

The base station 210-1 transmits a reference signal to the UE 220. The reference signal can be, for example, a demodulation reference signal (DMRS), a phase tracking reference signal (PTRS), a sounding reference signal (SRS), or a channel state information reference signal (CSI-RS). In the illustration of FIG. 2, three propagation signals are received by the UE 220 and correspond to the transmitted reference signal. A first propagation signal is received along a line of sight path 212 between the base station 210-1 and the UE 220. The base station 210-1 is the tap of this first propagation signal. A second propagation signal is received along a reflection path 214-1 (a non-line of sight path) by being reflected to UE 220 from the first reflection source 230-1. The first reflection source 230-1 is the tap of the second propagation signal. Similarly, a third propagation signal is received along another reflection path 214-2 (also a non-line of sight path) by being reflected to UE 220 from the second reflection source 230-2. The second reflection source 230-2 is the tap of the third propagation signal. When RTT measurements are performed on the reference signal, a decision is made as to which of the three propagation signals to use. Selecting the first propagation signal (e.g., the one corresponding to the line of sight path 212, as indicated with the check mark) and not the other two propagation signals (e.g., the ones corresponding to the reflection paths 214-1 and 214-2, as indicated with the two X marks) results in the best possible accuracy.

Similarly, the base station 210-2 transmits a reference signal to the UE 220. In turn, the UE 220 receives three propagation signals: one along a line of sight path between the base station 212-2 and the UE 220, another one along a reflection path that involves the first reflection source 230-1, and an additional one along a reflection path that involves the third reflection source 230-3. Here also, when multilateration is used, the accuracy of the UE's 220 location estimation is improved by performing RTT measurements of the propagation signal along the line of sight path (as indicated with the check mark), rather than propagation signals from non-line of sight paths (as indicated by the two X marks).

Furthermore, the base station 210-3 transmits a reference signal to the UE 220. Here, however, no line of sight path exists between the base station 210-3 and the UE 220 because of the fourth reflection source 230-4 being in between. Instead, the UE 220 receives two propagation signals: one along a reflection path that involves the second reflection source 230-2, and another one along a reflection path that involves the third reflection source 230-3. When multilateration is used, the accuracy of the UE's location estimation can be improved by selecting the better propagation signal (as indicated with the check mark). (The unselected propagation signal is denoted with an X mark). Alternatively, because both propagation signals from the base station 210-3 are reflections rather than line of sight transmissions of the reference signal, the multilateration may filter out either or both of the two propagation signals (e.g., RTT measurements on the reference signal sent by the base station 210-3 can be ignored).

In an example, to assist with the selection of a propagation signal per transmitted reference signal, the UE 220 can generate and send a power and time delay profile (PTDP). The PTDP can be generated per base station or, equivalently, per reference signal transmitted by a base station, where the UE 220 receives this reference signal as one or more propagation signals depending on propagation paths, as further described in the next figures. The PDTP indicates a power and a time delay per received propagation signal. Generally, a line of sight path results in a propagation signal having the strongest power and the smallest delay, relative to a reflection path. Hence, when a PTDP of a reference signal indicates a propagation signal that meets these criteria, this propagation signal can be selected and used in the UE's 220 location estimation (as in the case of the reference signal transmissions by the base stations 210-1 and 210-2). However, when a PTDP of a reference signal does not indicate these criteria (e.g., the propagation signal that has the strongest power does not have the smallest delay), it can be assumed that none of the propagation signals follows a line of sight transmission and, instead, each of the propagation signals follows a different reflection path (as in the case of the reference signal transmission by the base station 210-3). In this case, the strongest propagation signal may be selected or the different propagation signals can be filtered out.

In addition to using a PTDP report, accuracy improvements can be further attained by inputting, to a fusion algorithm, the PTDP report and other types of information, as further described in the next figures. The other type of information is related to the reference signal transmissions (e.g., the transmit beam information of each reference signal), the base stations 210 (e.g., their locations), to the reflection sources 230 (e.g., a map of their locations, a description of their reflection properties, and the like), and/or the UE 220. As far as the UE 220, the related information can be available from one or more sensors 240-1, 240-2, and 240-3, each of which can be coupled with a base station (e.g. installed at, collocated with, or at a known location relative to the base station). In an example, a sensor can be an optical sensor (e.g., a camera) generating sensor data that forms an image, from which the UE's 220 location can be determined based on geometric reconstruction. In another example, a sensor can be a radar that determines the range, angle, and/or velocity of the UE 220, from which the UE's location can be determined. In both examples, the related information is the raw sensor data and/or the estimated location.

For instance, and referring back to the reference signal transmitted by the base station 210-3, the PTDP of this reference signal can indicate that likely no line of sight propagation exists. This indication can be confirmed with image data generated by the sensor 240-3 (in this case, a camera) coupled with the base station 210-3. The corresponding two propagation signals can be filtered out. Instead, the UE's 220 location can be estimated from the reference signals transmitted by the base stations 210-1 and 210-2 (where each of these signals follow the corresponding line of sight path) and can be further refined based on image data generated by the sensor 240-1 coupled with the base station 210-1 and by the sensor 240-2 coupled with the base station 210-2.

FIG. 3 illustrates an example of a PTDP, according to an embodiment. In particular, propagation signal measurements 300 are performed on reference signals 310. In the interest of clarity of explanation, three reference signals 310-1, 310-2, and 310-3 are illustrated in FIG. 3 and correspond to the reference signals transmitted by the base stations 210-1, 210-2, and 210-3, respectively, of FIG. 2. In particular, a UE (e.g., the UE 220) receives three propagation signals that correspond to the first reference signal 310-1 (one of which follows a line of sight path and the other two follow reflection paths, and each of which corresponds to the reference signal 310-1 received from a first base station 210-1), three propagation signals that correspond to the second reference signals 310-2 (one of which follows a line of sight path and the other two follow reflection paths, and each of which corresponds to the reference signal 310-2 received from the second base station 210-2), and two propagation signals that correspond to the third reference signals 310-3 (both of which follow reflection paths, and each of which corresponds to the reference signal 310-3 received from a third base station 210-3).

In an example, the propagation signal measurements 300 include a power and a time delay of each propagation signal. The power is the power at which the UE receives the propagation signal. The time delay is the time difference between the transmission of the corresponding reference signal and the reception of the propagation signal. In the illustration of FIG. 3, the power can be absolute power 302 in dBm (e.g., the measured power of the received propagation signal referenced to one milliwatt). The time delay can be the absolute time delay 304 (e.g., accounting for the channel propagation delay, internal delay of the UE's modem, and accumulated timing advanced commands to synchronize the clocks of the applicable base station and the UE).

In the illustration of FIG. 3, the power and time delay of each one the propagation signals is indicated with an upward oriented arrow. More specific, the measurements of the three propagation signals corresponding to the first reference signal 310-1 are shown in the top plot, where the arrow farthest to the left corresponds to the line of sight propagation, which has the strongest power and the least time delay. The two arrows to the right correspond to reflection propagations, which have lower power and have larger time delays. Similarly, the measurements on the three propagation signals corresponding to the second reference signal 310-2 are shown in the middle plot, where the arrow farthest to the left corresponds to the line of sight propagation, which has the strongest power and the least time delay. The two arrows to the right correspond to reflection propagations, which have lower power and have larger time delays. In addition, the measurements on the two propagation signals corresponding to the third reference signal 310-3 are shown in the bottom plot. Here, the arrow farthest to the left indicates a relatively smaller delay than the arrow to the right, while also having a less power. Accordingly, it may be assumed that these two propagation signals follow reflection paths.

The UE can report PTDP per base station based on the propagation signal measurements 300. Various types of information can be included in the PTDP and various structures of the report are possible.

In an example, the PTDP can include the absolute time delay and the absolute power per propagation of a reference signal (illustrated as a pair $[t_i, p_i]_j$, where "j" is an identifier of the reference signal or of the base station that transmitted the reference signal (e.g., "j" is a cell identifier), and where "i" is an identifier of the received propagation signal (e.g., an index)). For instance, $[t_i, p_1]_2$ is the absolute time delay and the absolute power of the first propagation signal corresponding to the second reference signal 310-2.

In this example also, a power threshold 330 can be used. The power threshold can be a predefined amount of power (e.g., predefined amount of absolute of power). If the power of a propagation signal exceeds the power threshold 330, the corresponding power and time (e.g. $[t_i, p_i]_j$) are included in the report. Otherwise, these measurements are not included in the report.

In addition, for each of the reference signals 310 (or corresponding base stations or cell), the UE includes a set $\{[t_i, p_i]\}_j$, where "j" is set to the reference signal identifier or to the cell identifier, where "i" varies between "l" and "k," and where "k" is the total number of the propagations per the reference signal "j" that exceed the power threshold 330. For instance, in the illustration of FIG. 3, the PTDP of the first reference signal 310-1 consists of $\{[t_i, p_i], \{[t_2, p_2], [t_3, p_3]\}_1$. Each set can be included in the same report or can be sent in a separate report.

In another example, rather reporting absolute measurements, relative measurements are reported. In particular, for each base station, the strongest power of the received propagation signals is determined. The power of each propagation signal can be reported as the log of a ratio of this power over the strongest power. Further, the strongest power (e.g., expressed as an absolute power) can be reported for a baseline comparison with other reference signals of other base stations. Additionally or alternatively, and for each base station, the shortest time delay or the time delay of the strongest propagation signal is reported. The difference between this time delay and the time delay of each of the remaining propagation signals is also reported.

Figure 4:
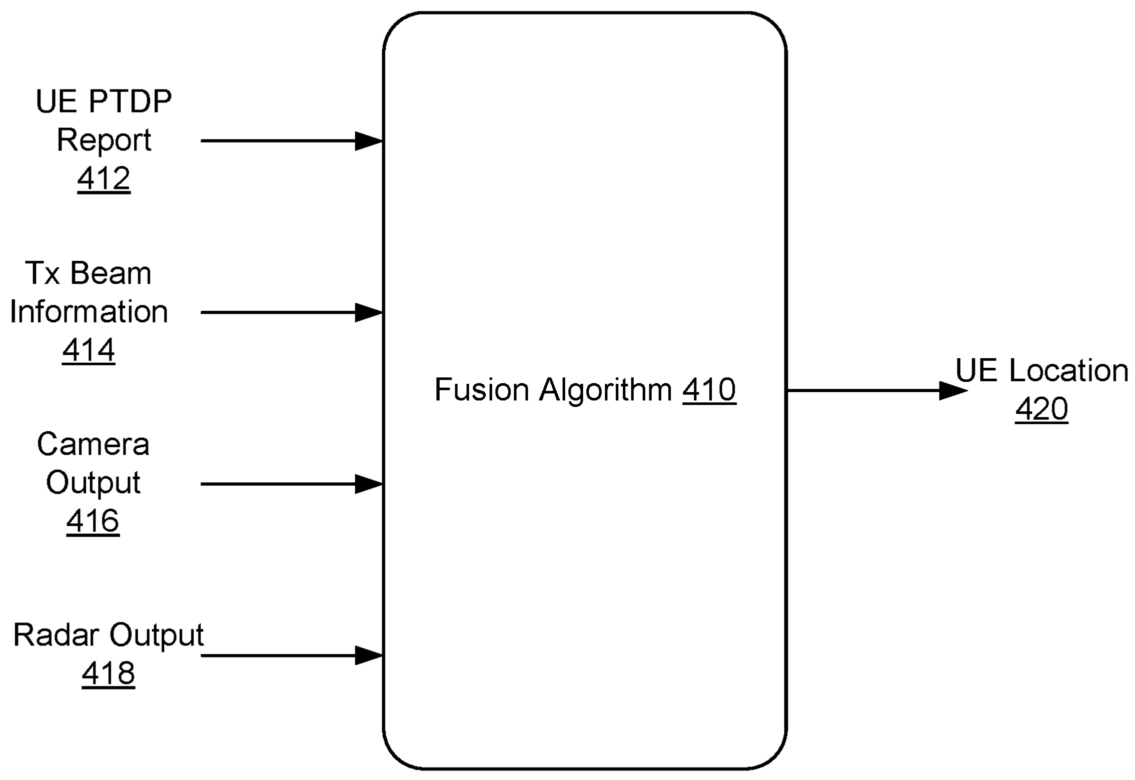
FIG. 4 illustrates an example of a fusion algorithm to estimate a user equipment (UE) location, according to an embodiment.

FIG. 4 illustrates an example of a fusion algorithm 410 to estimate a UE location 420 (e.g., a location of a UE), according to an embodiment. In this example, the fusion algorithm 410 receives multiple input including a UE PTDP report 412 and other types of information to output the UE location 420. Generally, the fusion algorithm can be implemented as a computer-readable program that can be hosted and executed on a network entity, such as a base station, a location server, the UE itself, another UE, or any other component of a cellular network (e.g., a gateway computer, a backend server, and the like). FIG. 4 illustrates the other types of information as includes transmit beam information 414, camera output 416, and radar output 416. However, additional or alternative types of information are possible and relate to transmitted reference signals, base stations transmitting the reference signals, reflection sources, and/or the UE.

The UE PTDP report 412 represents a report determined and/or sent by the UE and includes PTDP information (e.g., as described above with regard to FIG. 3). The PTDP information can be the power and time delay (e.g., absolute or relative power and time delay measurements) per received reference signal. One report can be sent by the UE to the network entity and includes the PTDPs for different reference signals received from different base stations. Alternatively, one report can be set per base station.

The transmit beam information 414 includes information about the transmit beam used in each reference signal transmission. The camera output 416 includes raw image data generated by one or more cameras and/or an estimation of the UE location 420 derived from the image data. Similarly, the radar output 418 includes the range, angle, and/or velocity of the UE 220 detected by one or more radars and/or an estimation of the UE location 420 derived from such radar data.

Various implementations of the fusion algorithm 410 are possible. Generally, the fusion algorithm 410 may determine and apply weights to the reported PTDPs depending on the PTDPs themselves and/or the other inputs 414-418.

In one example, the fusion algorithm 410 selects a propagation signal per base station based on the UE PTDP report 412 and the other inputs 414-418 and uses RTT measurements on the selected propagation signals to estimate the UE location 420 without further consideration of the other inputs 414-418. In particular, for each base station, the propagation signal that has the strongest power and smallest propagation delay is selected. If none of the propagation signals corresponding to a reference signal transmitted from a base station meets these two criteria, the fusion algorithm 410 can filter out this reference signal (e.g., set its weight to zero). Alternatively, the fusion algorithm 410 can select one of the propagation signals by considering the other inputs 414-418. For instance, an estimation of the UE 420 can be derived from any or all of the other inputs 414-418 and the propagation signals that fits best this estimation (e.g., by having the closest time delay to this estimation) is selected. Once one propagation signal (if any) is selected per base station, the fusion algorithm 410 uses the selected propagation signals across multiple base stations in a multilateration estimation of the UE location 420. In this case, the fusion determines a weight of each selected propagation signal based on the reported power of this propagation signal. Generally, the larger the power, the larger the weight is. In the multilateration estimation, the margin around the estimation (e.g., the range of the circle diameters) can be inverse to the weight (e.g., the larger the weight, the smaller the margin is, thereby resulting in a more accurate estimation).

In another example, the fusion algorithm 410 selects a propagation signal per base station based on the UE PTDP report 412 and not the other inputs 414-418 and uses RTT measurements on the selected propagation signals and the other inputs 414-418 to estimate the UE location 420 without further consideration of the other inputs 414-418. In particular, for each base station, the propagation signal that has the strongest power and smallest propagation delay is selected. If none of the propagation signals corresponding to a reference signal transmitted by a base station meets these two criteria, the fusion algorithm 410 can filter out this reference signal (e.g., set its weight to zero). Once one propagation signal (if any) is selected per base station, the fusion algorithm 410 uses the selected propagation signals in a multilateration estimation. In this case, the fusion determines a weight of each selected propagation signal based on the reported power of this propagation signal. Generally, the larger the power, the larger the weight is. In the multilateration estimation, the margin around the estimation (e.g., the range of the circle diameters) can be inverse to the weight (e.g., the larger the weight, the smaller the margin is, thereby resulting in a more accurate estimation). Further, for each of the other inputs 412-418, the fusion algorithm 410 also estimates a location of the UE and fuses the multilateration estimation and the other estimations to generate the UE location 420.

In yet another example, the fusion algorithm 410 performs the propagation signal selection and the location estimation using both the UE PTDP report 412 and the other inputs 414-418. In particular, for each base station, the propagation signal that has the strongest power and smallest propagation delay is selected. If none of the propagation signals corresponding to a reference signal transmitted by a base station meets these two criteria, the fusion algorithm 410 can filter out this reference signal (e.g., set its weight to zero). Alternatively, the fusion algorithm 410 can select one of the propagation signals by considering the other inputs 414-418. For instance, an estimation of the UE 420 can be derived from any or all of the other inputs 414-418 and the propagation signals that fits best this estimation (e.g., by having the closest time delay to this estimation) is selected. Once one propagation signal (if any) is selected per base station, the fusion algorithm 410 uses the selected propagation signals in a multilateration estimation. In this case, the fusion determines a weight of each selected propagation signal based on the reported power of this propagation signal. Generally, the larger the power, the larger the weight is. In the multilateration estimation, the margin around the estimation (e.g., the range of the circle diameters) can be inverse to the weight (e.g., the larger the weight, the smaller the margin is, thereby resulting in a more accurate estimation). Further, for each of the other inputs 412-418, the fusion algorithm 410 also estimates a location of the UE and fuses the multilateration estimation and the other estimations to generate the UE location 420.

Figure 5:
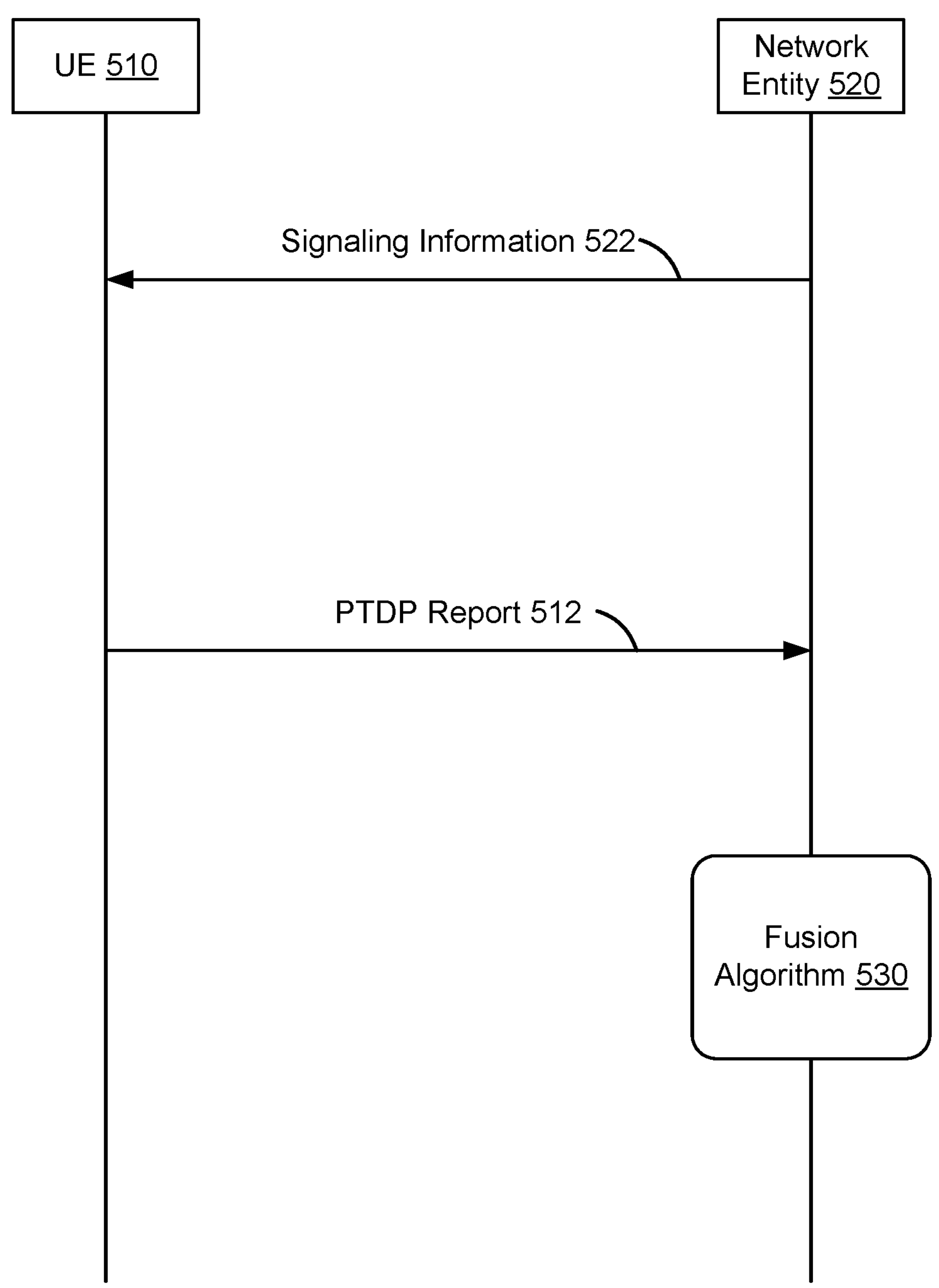
FIG. 5 is a sequence diagram illustrating an example of estimating a UE location, according to an embodiment.

FIG. 5 is a sequence diagram illustrating an example of estimation a UE location (e.g., a location of a UE 510), according to an embodiment. In an example, the UE 510 is in communication with a network entity 520. The network entity 520 can be a base station, a location server, another UE, or another component of the cellular network.

In a first step, the network entity 520 transmits signaling information 522 to the UE 520. Generally, the signaling information 522 configures the UE 510 to generate and report PTDPs, each corresponding to a reference signal transmitted by a base station and indicating a power and time delay per received propagation signal. For instance, the signaling information 522 may indicate one or more parameters for a report on a reference signal that is transmitted by a base station. The base station can be the same or can be different from the network entity 520. The report can be specific to one base station or can be common to multiple base stations (in which case the one or more parameters also relate to the other base stations and/or reference signals transmitted by such base stations).

In turn, the UE 510 receives propagation signals, each corresponding to a propagation path along which a reference signal is transmitted from a base station. Given the signaling information 522, the UE 510 generates a PTDP per base station and sends a PTDP 512 report to the network entity 520. The PTDP report 512 can be specific to one base station or can be common to and include PTDPs of multiple reference signals transmitted from multiple base stations.

The network entity 520 receives the PTDP report 512 and can determine the UE location. This determination need not, but may, involve other types of information. If no other types of information is used, the network entity 520 can select one propagation signal per base station (e.g., based on the power and time delay measurements of the various propagation signals), determine weights based on the reported power measurements, and perform a multilateration estimation of the UE location based on the weights. If other types of information are used, the PTDP report 512 and the other types of information are input to a fusion algorithm 530 of the network entity 520, similar to the fusion algorithm 410 of FIG. 4. The output of the fusion algorithm is the UE location estimation.

Although FIG. 5 illustrates that the UE location estimation is performed by a network entity 520 other than the UE 510, the embodiments of the present disclosure are not limited as such. Instead, the UE 510 can receive the signaling information 522 from the network entity 520 and can generate the PTDP report 512. The UE 510 may, but need not, transmit the PTDP report 512 to the network entity 520.

In one example, the UE 510 does not perform this transmission and instead determines its position based on the PTDP report 512. In this example, the fusion algorithm may, but need not, be hosted on the UE 510. If hosted, the UE 510 can receive the other types of information from the network entity 520 and can input the PTDP report 512 and the other types of information to the fusion algorithm 530 to estimate the UE location.

In another example, the transmission of the PTPD report 512 occurs. In this example, the UE 510 can receive assistance information back from the network entity 520 to then estimate the UE location. The assistance information can include, for instance, a selection of propagation signals based on an execution of the fusion algorithm 530 by the network entity 520 In another illustration, the assistance information includes output of a deep learning model that uses the PTDP 512 to generate absolute position. The absolute position can be local coordinates or global coordinates (e.g., latitude and longitude).

In a further example, the network entity 520 is another UE that is within a same area as the UE 510. A sidelink channel may exist between the UE 510 and the other UE and the PTDP 512 can be sent via the sidelink channel. In this example, the other UE may have already performed positioning in the area. Accordingly, the other UE may already have profiled the area (e.g., generated a PTDP) and/or have received assistance information. Based on this existing data, the other UE can assist the UE 510 in determining its UE location (e.g., by sending the other device's PTDP, sending the assistance information, and the like).

Figure 6:
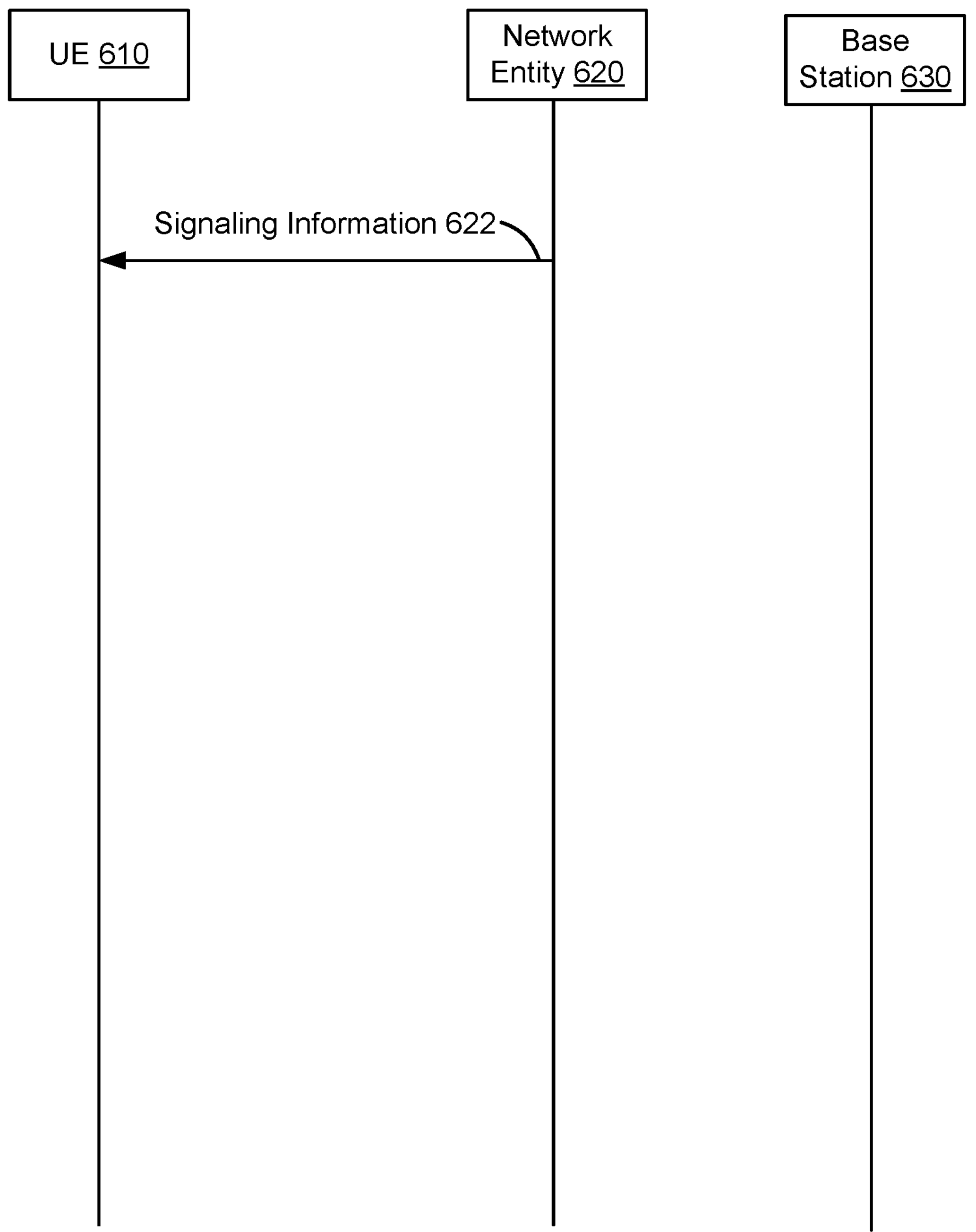
FIG. 6 is a sequence diagram illustrating an example of sending signaling information to a UE, according to an embodiment.

FIG. 6 is a sequence diagram illustrating an example of sending signaling information 622 to a UE 610, according to an embodiment. A network entity 620 sends this signaling information 622, where the network entity 620 can be a base station (e.g., one of a serving cell), a location server, another UE, or another component of the cellular network. The signaling information 622 is an example of the signaling information 522 of FIG. 5. In particular, rather than each neighboring cell (e.g., such as a base station 630 that provides coverage of a neighboring cell to the serving cell) sending its own signaling information specific to the reference signal transmitted in the neighboring cell (e.g., by the base station 630), the network entity 620 sends a single set of signaling information 622 applicable to the serving cell and the neighboring cells.

In an example, the signaling information 622 includes a list of cells and/or remote radio heads (RRH) to measure PTDP (including quasi colocation (QCL) indication per cell). The signaling information 622 also includes a power threshold of reported taps in the PTDP (e.g., the power threshold 330 of FIG. 3) and a maximum number of propagations per reference signal to be reported.

Figure 7:
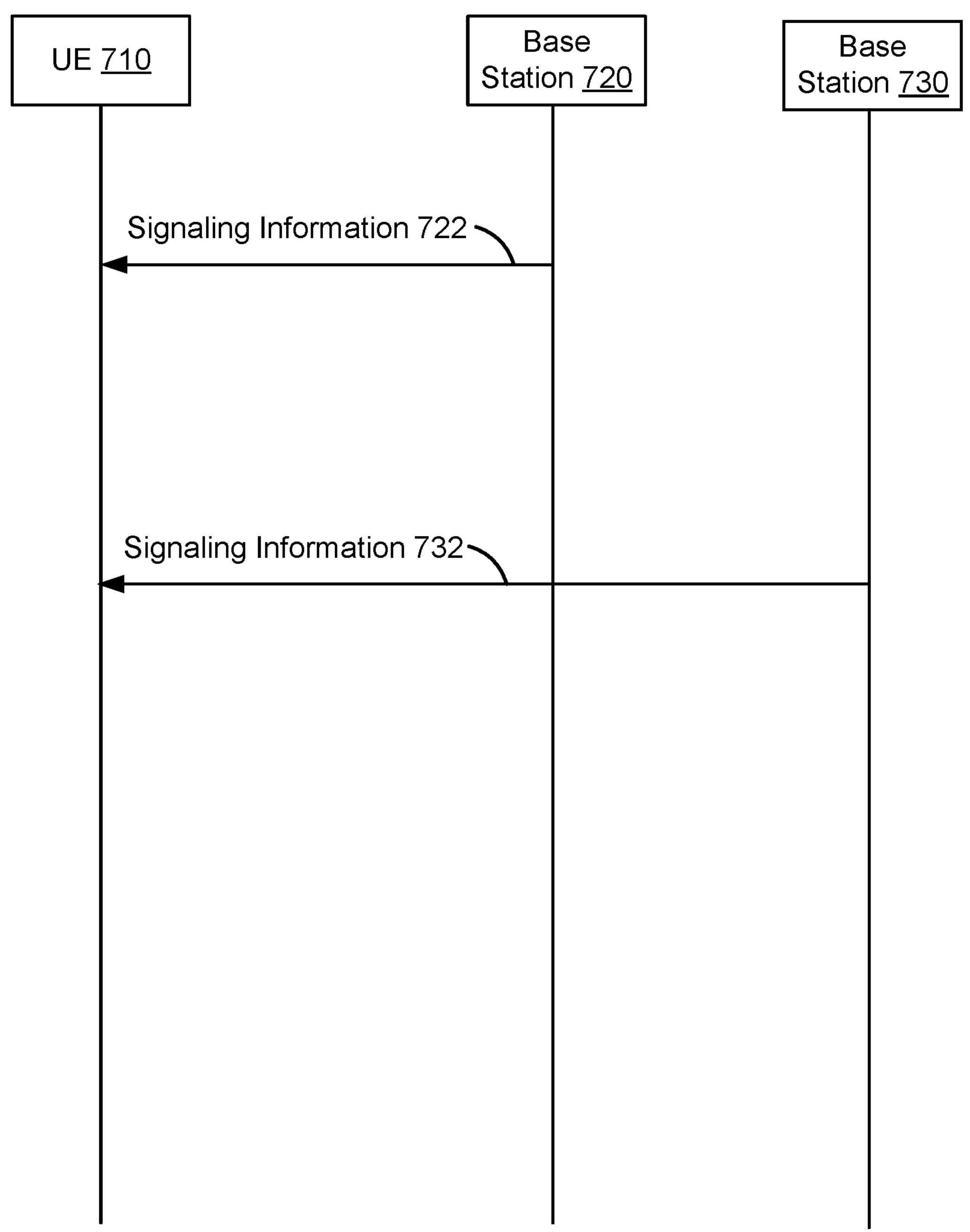
FIG. 7 is a sequence diagram illustrating another example of sending signaling information to a UE, according to an embodiment.

FIG. 7 is a sequence diagram illustrating another example of sending signaling information 722 and 732 to a UE 710, according to an embodiment. A base station 720 (e.g., one of a serving cell) sends the first signaling information 722. A base station 730 (e.g., one of a neighboring cell) sends the second signaling information 732. Each the signaling information 722 and 732 is an example of the signaling information 522 of FIG. 5.

Here, unlike the illustration of FIG. 6, each base station that transmits a reference signal to the UE 710 sends its own specific signaling information to configure the UE to generate and report PTDP specific to the reference signal (or, equivalently, specific to the base station). In an example, each the signaling information 722 and 732 need not include a list of cells to measure PTDP because each of the signaling information 722 and 732 is specific to a cell. Instead, each of the signaling information 722 and 732 includes a power threshold of reported taps in the PTDP (e.g., the power threshold 330 of FIG. 3) and a maximum number of propagation signals per base station to be reported, and the power threshold and maximum number can vary between the signaling information 722 and 732.

Figure 8:
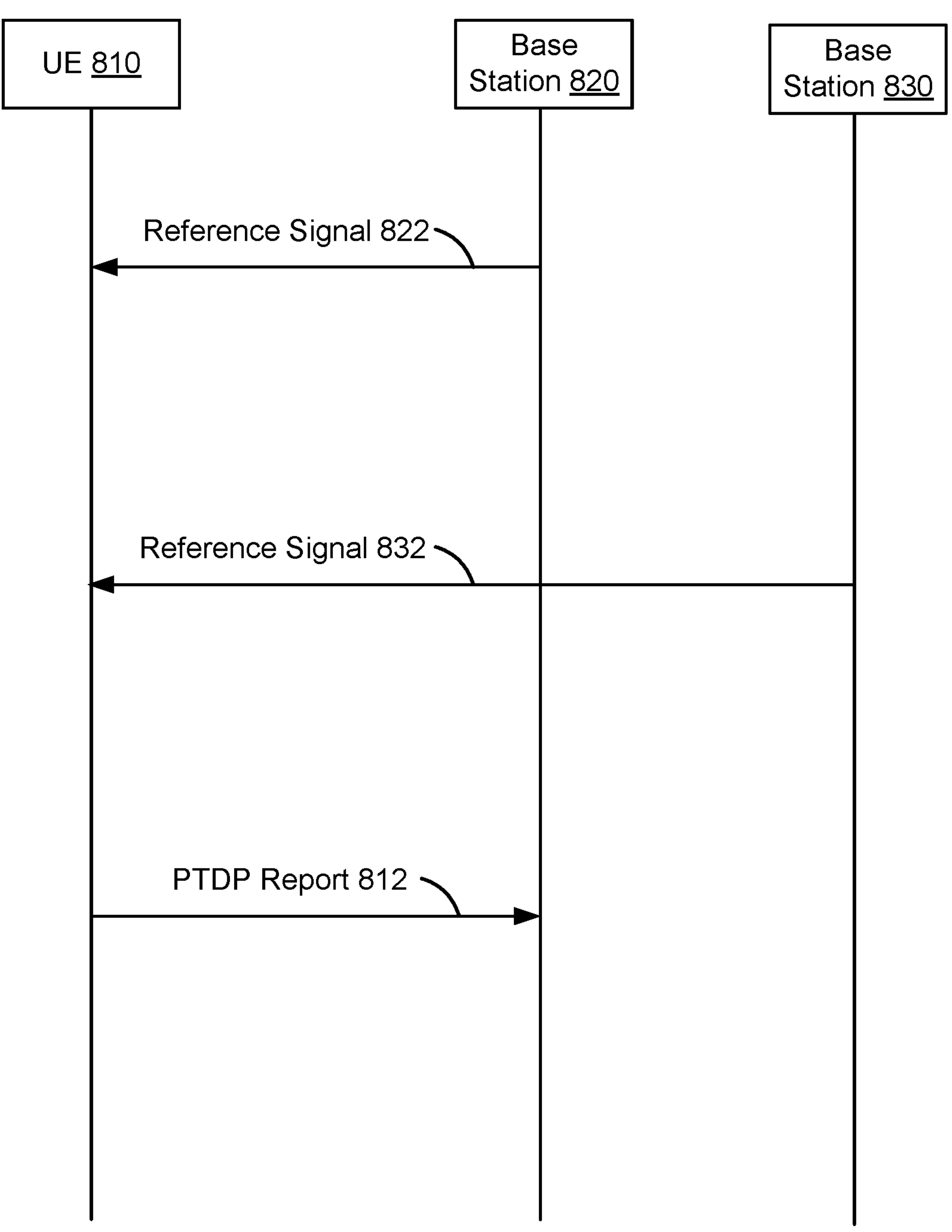
FIG. 8 is a sequence diagram illustrating an example of reporting a power and time delay profile, according to an embodiment.

FIG. 8 is a sequence diagram illustrating an example of reporting a PTDP, according to an embodiment. A UE 810 is in communication with a base station 820 (e.g., one of a serving cell) and a base station 830 (e.g., one of a neighboring cell) and has received signaling information for reporting a PTDP per reference signal transmitted by each of the base stations 820 and 830.

As illustrated, the first base station 820 transmits a first reference signal 822 to the UE 810. Due to multipath propagation, the UE 810 receives one or more first propagation signals (not shown in FIG. 8) that correspond to the first reference signal 822. For each received propagation signal corresponding to the first reference signal 822, the UE 810 performs power and time measurements on the received propagation signal (absolute and/or relative measurements) and includes the power and time measurements as a pair in the PTDP of the reference signal 822. Similarly, the second base station 830 transmits a second reference signal 832. The UE 810 receives one or more second propagation signals that correspond to the second reference signal 832, and performs and includes power and time measurements in the PTDP of the second reference signal 832.

Thereafter, the UE 810 sends a PTDP report 812 to the first base station 820 (e.g., the one of the serving cell, the base station that sent the signaling information of all the reference signals to the UE 810, or the base station performing the location estimate). The PTDP report 812 includes the PTDP of each of the first reference signal 822 and the second reference signal 832.

In the case where the base station 820 comprises the network entity estimating the location of the UE 810, the base station 820 relies on the PTDP report 812 to do so. Otherwise, the base station 812 sends the PTDP report 812 to the applicable network entity.

Figure 9:
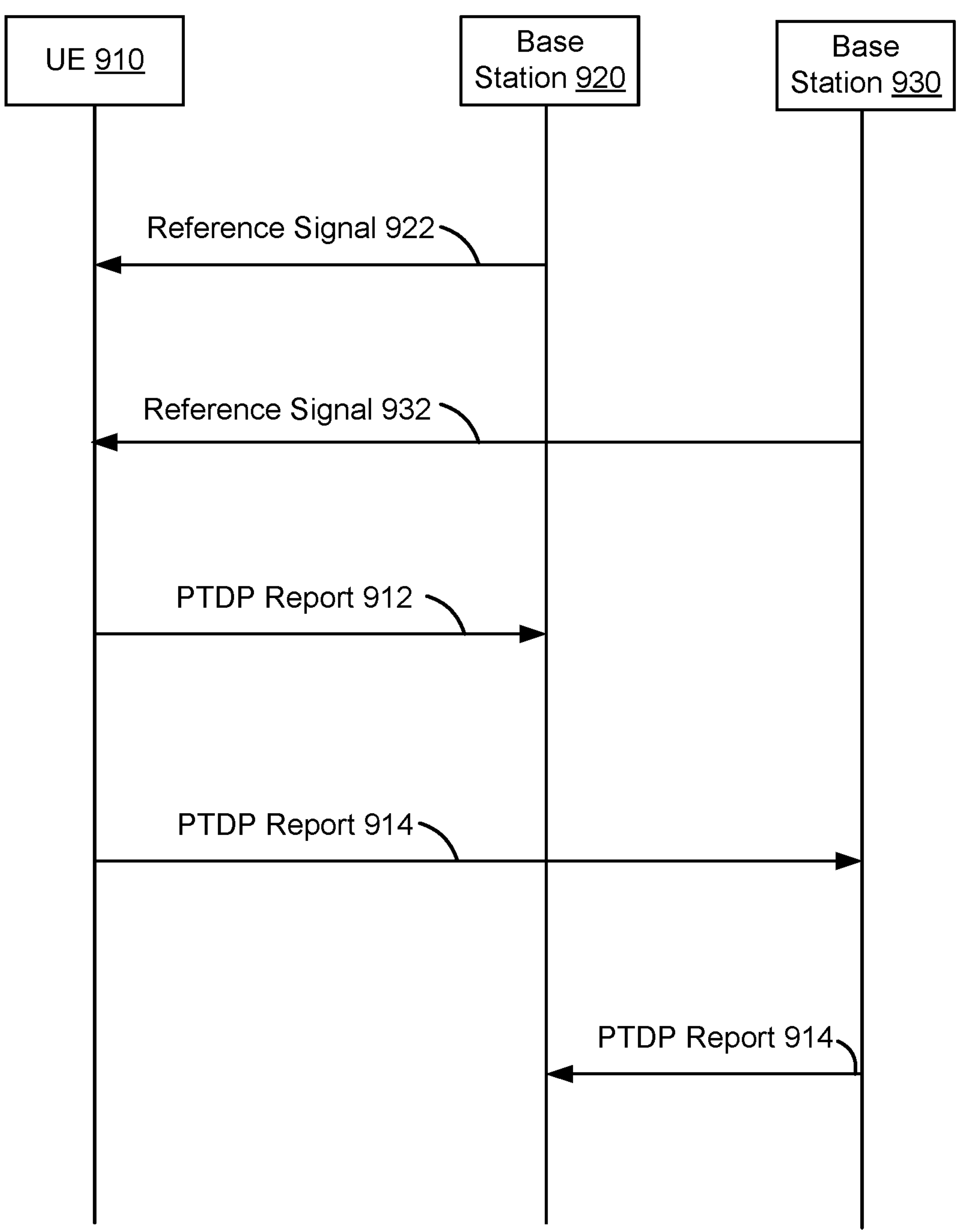
FIG. 9 is a sequence diagram illustrating another example of reporting a power and time delay profile, according to an embodiment.

FIG. 9 is a sequence diagram illustrating another example of reporting a PTDP according to an embodiment. A UE 910 is in communication with a base station 920 (e.g., one of a serving cell) and a base station 930 (e.g., one of a neighboring cell) and has received signaling information for reporting a PTDP per reference signal transmitted by each of the base stations 920 and 930. Here, rather than sending a single PTDP report that includes the PTDPs of all the reference signals, the UE 910 sends a PTDP report per reference signal.

As illustrated, the first base station 920 transmits a first reference signal 922 to the UE 910. Due to multipath propagation, the UE 910 receives one or more first propagation signals that correspond to the first reference signal 922. For each received propagation signal, the UE 910 performs power and time measurements on the received propagation signal (absolute and/or relative measurements) and includes the power and time measurements as a pair in the PTDP of the reference signal 922. The UE 910 sends, to the first base station 920, a PTDP report 912 that includes the PTDP of the reference signal 922.

Similarly, the second base station 930 transmits a second reference signal 932. The UE 910 receives one or more second propagation signals that correspond to the second reference signal 932, performs and includes power and time measurements in the PTDP of the second reference signal 932, and sends, to the second base station 930, a PTDP report 914 that includes the PTDP of the second reference signal 932.

In the case where the first base station 920 is the network entity estimating the location of the UE 910, the second base station 930 sends the PTDP report 914 to the first base station 920. And the first base station 920 relies on both PTDP reports 912 and 914 to estimate the location of the UE 910. Otherwise, both base stations 920 and 930 send their PTDP reports 912 and 914 to the applicable network entity.

Figure 10:
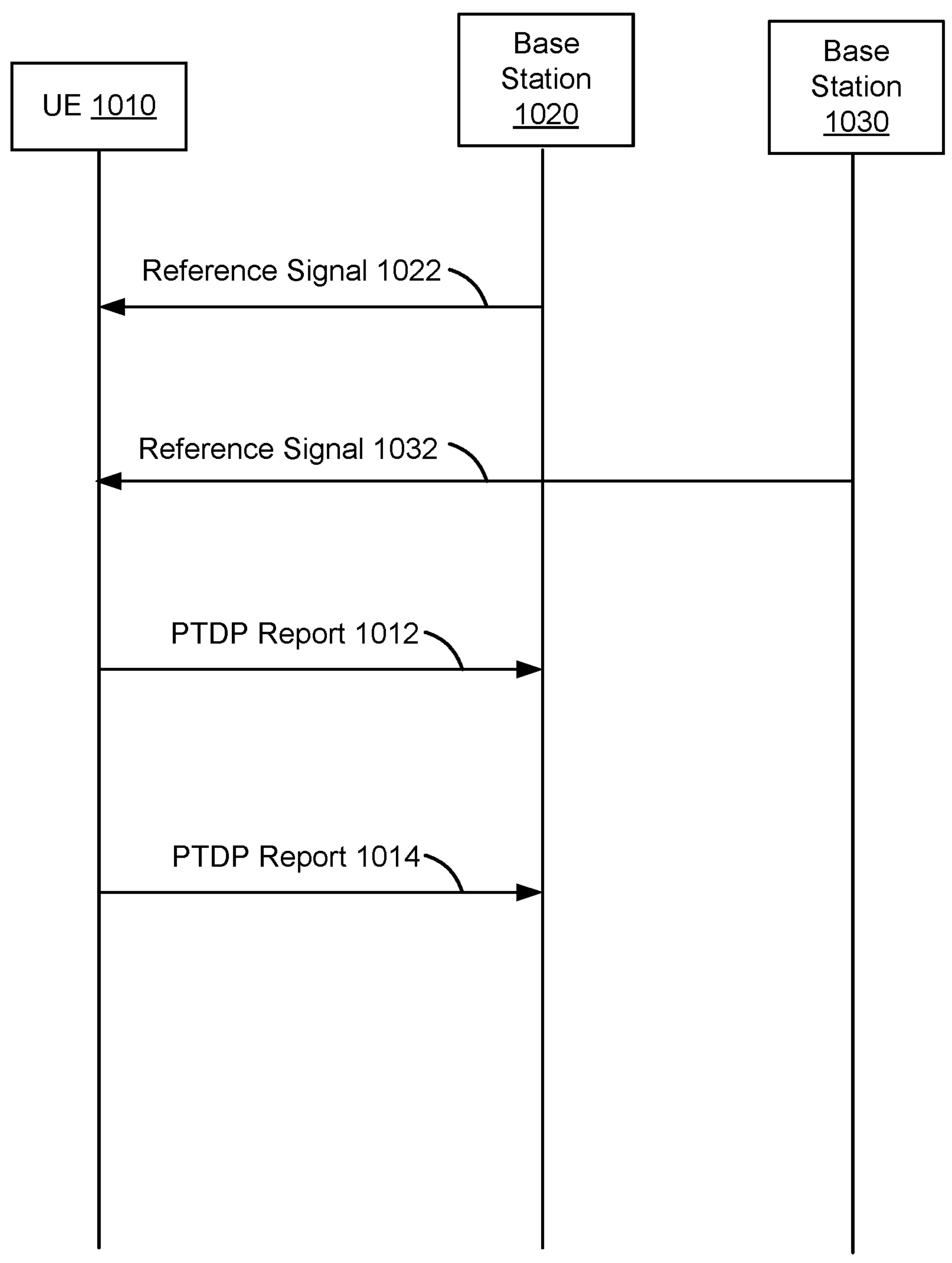
FIG. 10 is a sequence diagram illustrating yet another example of reporting a power and time delay profile, according to an embodiment.

FIG. 10 is a sequence diagram illustrating yet another example of reporting a PTDP, according to an embodiment. A UE 1010 is in communication with a base station 1020 (e.g., one of a serving cell) and a base station 1030 (e.g., one of a neighboring cell) and has received signaling information for reporting a PTDP per reference signal transmitted by each of the base stations 1020 and 1030. Here, rather than sending a single PTDP report that includes the PTDPs of all the reference signals, the UE 1010 sends a PTDP report per reference signal and the PTDP report is sent to only one base station (illustrated as the base station 1020, where this base station 1020 can be the one of the serving cell, the base station that sent the signaling information of all the reference signals to the UE 1010, or the base station performing the location estimate).

As illustrated, the first base station 1020 transmits a first reference signal 1022 to the UE 1010. Due to multipath propagation, the UE 1010 receives one or more first propagation signals that correspond to the first reference signal 1022. For each received propagation signal, the UE 1010 performs power and time measurements on the received propagation signal (absolute and/or relative measurements) and includes the power and time measurements as a pair in the PTDP of the reference signal 1022. The UE 1010 sends, to the first base station 1020, a PTDP report 1012 that includes the PTDP of the reference signal 1022.

Similarly, the second base station 1030 transmits a second reference signal 1032. The UE 1010 receives one or more second propagation signals that correspond to the second reference signal 1032, performs and includes power and time measurements in the PTDP of the second reference signal 1032, and sends, to the first base station 1020, a PTDP report 1014 that includes the PTDP of the second reference signal 1032.

In the case where the first base station 1020 is the network entity estimating the location of the UE 1010, the first base station 1020 relies on both PTDP reports 1012 and 1014 to estimate the location of the UE 1010. Otherwise, the base station 1020 sends the PTDP reports 1012 and 1014 to the applicable network entity.

Figure 11:
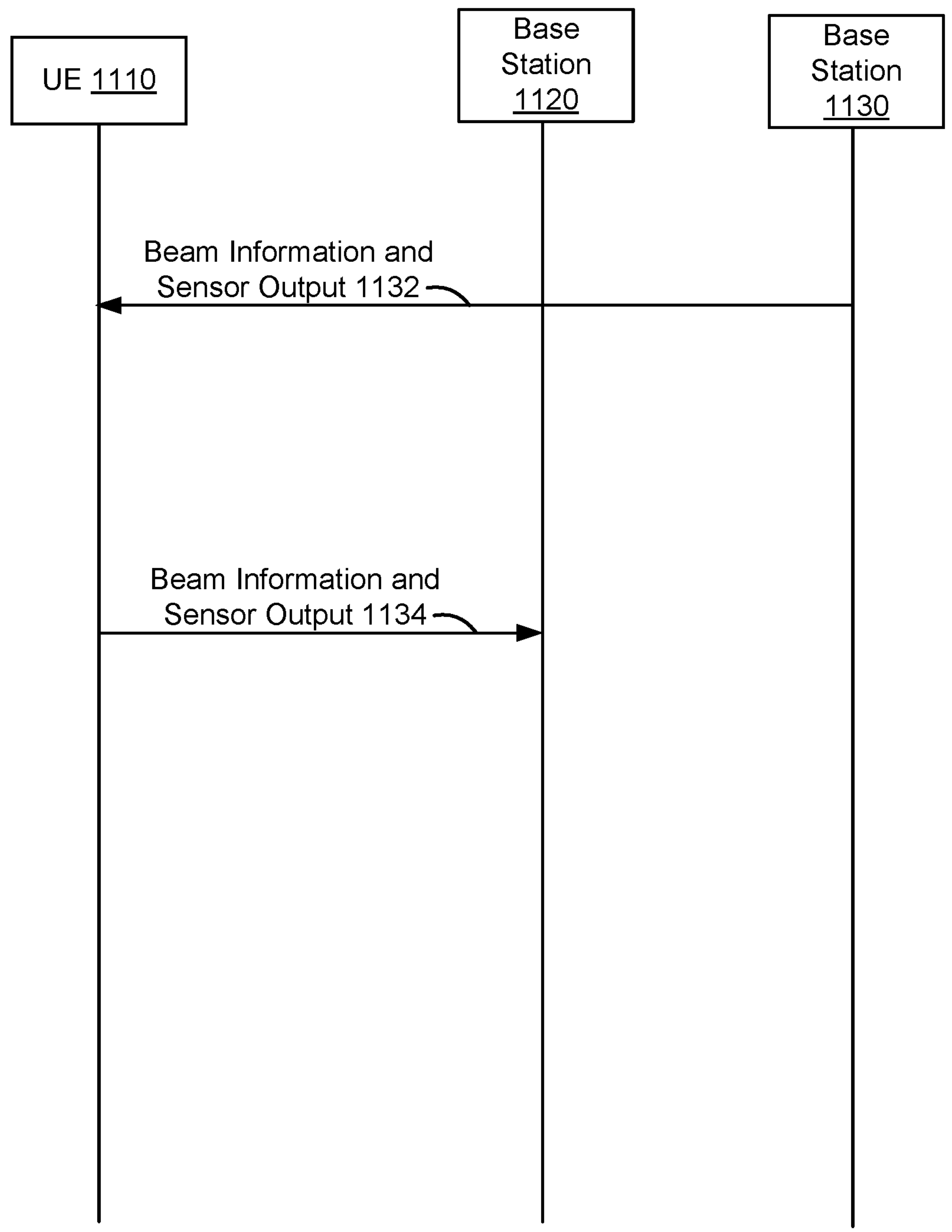
FIG. 11 is a sequence diagram illustrating an example of sending beam information and sensor output, according to an embodiment.

FIG. 11 is a sequence diagram illustrating an example of sending beam information and sensor output, according to an embodiment. As described herein above, the beam information and sensor output (e.g., raw image data, raw radar data, and/or location estimates derive from the raw image data and/or radar data) can be input to a fusion algorithm, in addition to one or more PTDP reports. In turn, the fusion algorithm outputs a location estimate.

In the illustration of FIG. 11, a UE 1110 is in communication with a base station 1120 and a base station 1130, has received signaling information for reporting a PTDP per reference signal transmitted by each of the base stations 1120 and 1130, and has sent one or more PTDP reports accordingly. In addition, the base station 1130 sends its beam information and sensor output 1132 (e.g., the transmit beam of the reference signal the base station 1130 transmitted to the UE 1110, and the sensor data of a second coupled with the base station 1130 and/or sensor-data based location estimate) to the UE 1110. In turn the UE sends the beam information and sensor output 1134 to the base station 1120 (where this base station 1120 can be the one of the serving cell, the base station that sent the signaling information of all the reference signals to the UE 1110, or the base station performing the location estimate). In the case where the base station 1120 is the network entity that executes the fusion algorithm, the base station 1120 determines the location of the UE 1110 based on the beam information and sensor output 1134. Otherwise, the base station 1120 sends, to the applicable network entity, the beam information and sensor output 1134 and its own beam information and sensor output.

Figure 12:
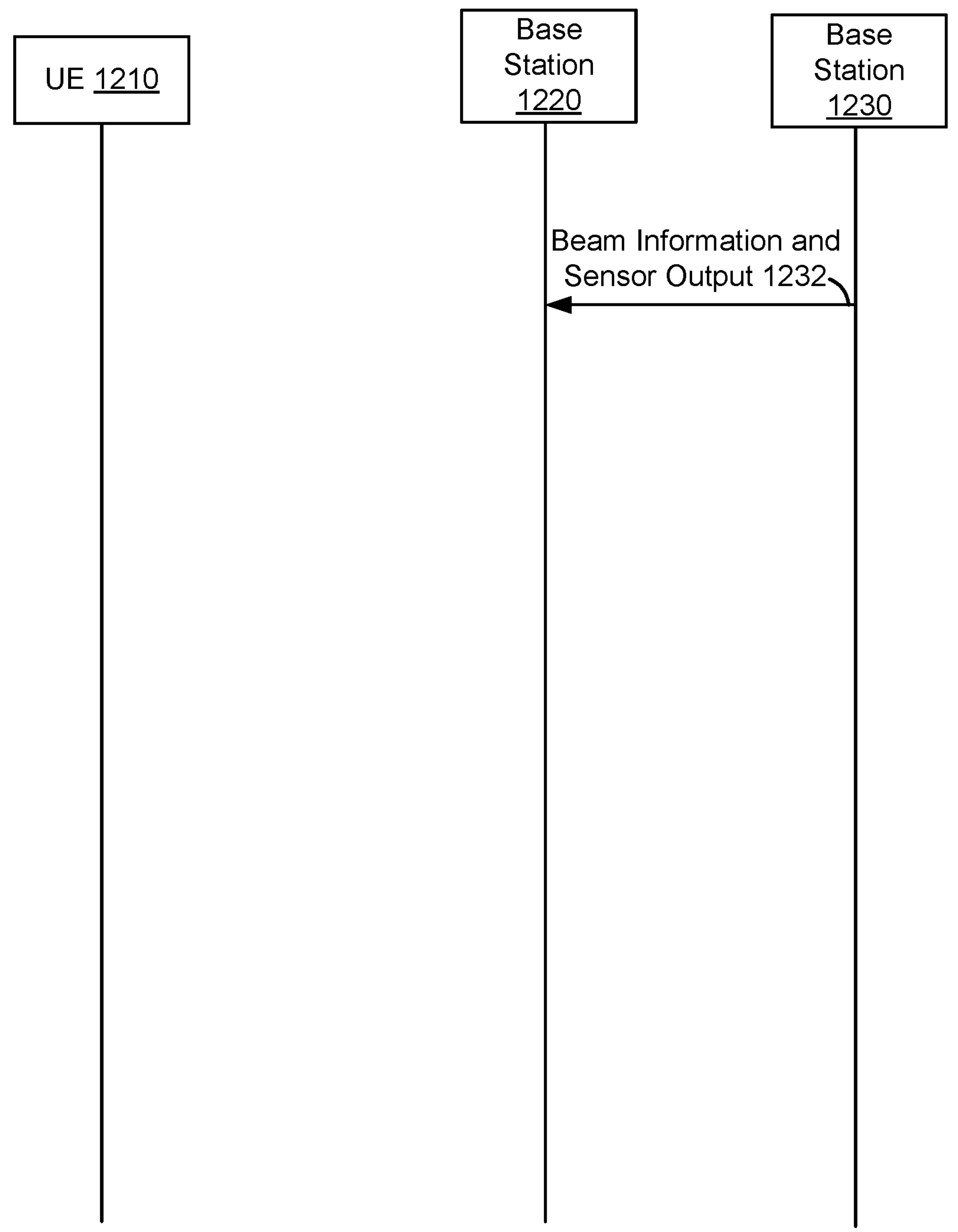
FIG. 12 is a sequence diagram illustrating another example of sending beam information and sensor output, according to an embodiment.

FIG. 12 is a sequence diagram illustrating another example of sending beam information and sensor output, according to an embodiment. here, a UE 1210 is in communication with a base station 1220 and a base station 1230, has received signaling information for reporting a PTDP per reference signal transmitted by each of the base stations 1220 and 1230, and has sent one or more PTDP reports accordingly. In addition, the base station 1230 sends its beam information and sensor output 1232 (e.g., the transmit beam of the reference signal the base station 1230 transmitted to the UE 1210, and the sensor data of a second coupled with the base station 1230 and/or sensor-data based location estimate) to the base station 1220 (where this base station 1220 can be the one of the serving cell, the base station that sent the signaling information of all the reference signals to the UE 1210, or the base station performing the location estimate). In the case where the base station 1220 is the network entity that executes the fusion algorithm, the base station 1220 determines the location of the UE 1210 based on the beam information and sensor output 1232. Otherwise, the base station 1220 sends, to the applicable network entity, the beam information and sensor output 1232 and its own beam information and sensor output.

Figure 13:
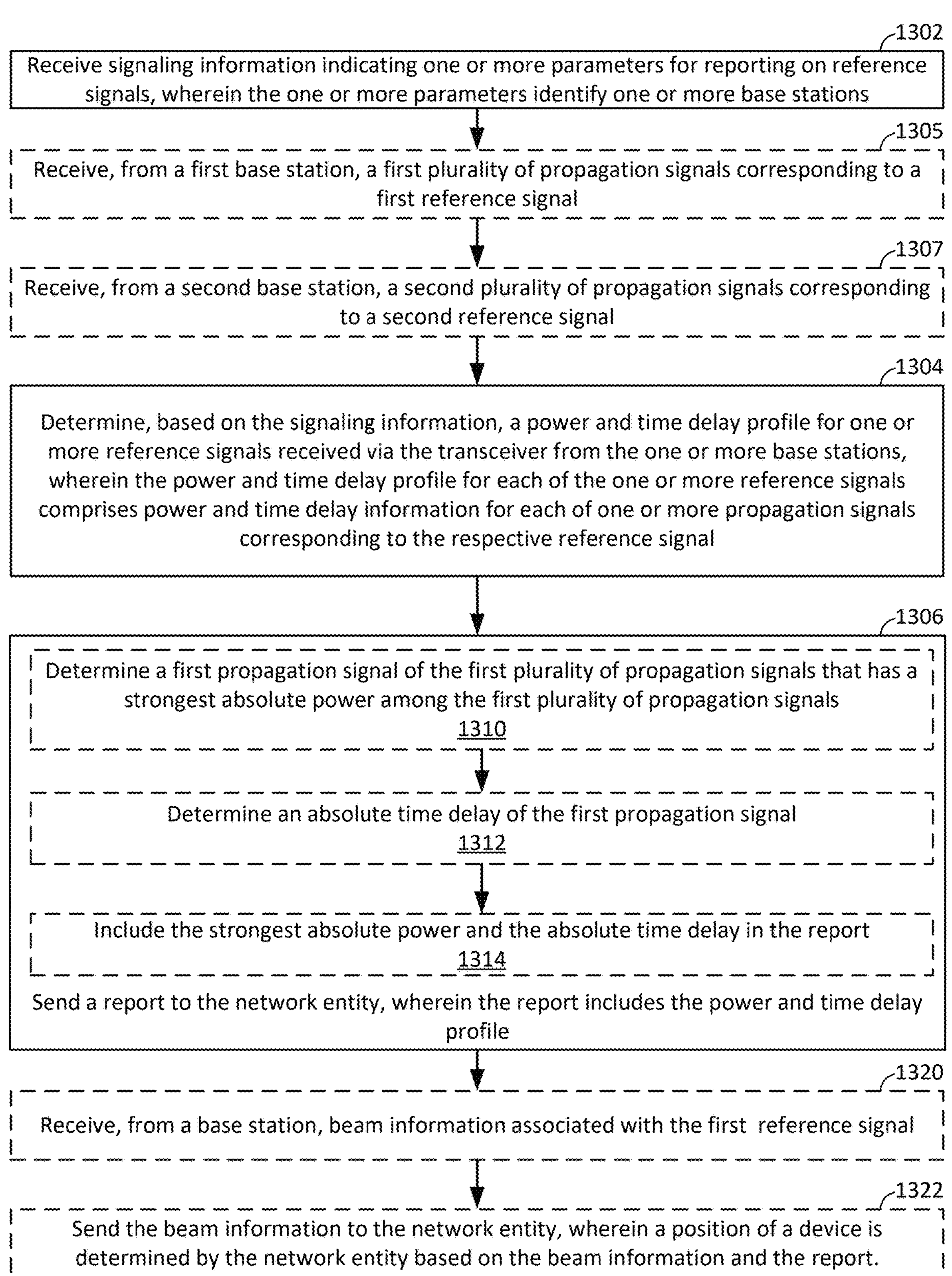
FIG. 13 is a flow diagram illustrating an example of a method of reporting a power and time delay profile, according to an embodiment.

FIG. 13 is a flow diagram illustrating an example of a method of reporting a power and time delay profile, according to an embodiment. The method may represent a method implemented by a device for reporting positioning-related information to a network entity. The network entity can be a base station, a location server, another UE, or another component of a cellular network. As such, the functionality shown in the blocks of FIG. 13 may be performed by the device. Further, means for performing the functionality may include hardware and/or software components of the device 1500 illustrated in FIG. 15, which may comprise a UE. Additionally, it can be noted that, as with other figures appended hereto, FIG. 13 is provided as a non-limiting example. Other embodiments may vary, depending on desired functionality. For example, the functional blocks illustrated in the method may be combined, separated, or rearranged to accommodate different embodiments.

At block 1302, the functionality comprises receiving signaling information indicating one or more parameters for reporting on a reference signals, wherein the one or more parameters identify one or more base stations. In an example, the signaling information is received from the network entity, where network entity sends signaling information for all of the base stations that are in communication with the device (e.g., within an RF range of the device), as in the illustration of FIG. 6. In this example, the one or more parameters identify the one or more bases stations for which power and time delay measurements are to be included in the report. The one or more parameters further identify a power threshold associated with reporting power and time delay measurements per base station, wherein a first power and a first time delay of a first reference signal received from a base station are included in the report upon a determination that the first power exceeds the power threshold. In addition, the one or more parameters further identify a maximum number of propagations to be measured per base station, wherein the report comprises a total number of power measurements per base station equal to or less than the maximum number. In an illustration, the one or more parameters include a list of cells and/or RRH to measure PTDP (including QCL indication per cell), a power threshold of reported taps in the PTDP (e.g., the power threshold 330 of FIG. 3), and a maximum number of propagation signals received from a base station to be reported. In another example, the network entity is the base station and sends signaling information specific to the base station, as in the illustration of FIG. 7. The device also receives the applicable signaling information from each of the other base stations (e.g., a second signaling information of a second base station). Here, the signaling information per base station can include, for instance, a power threshold of reported taps in the PTDP (e.g., the power threshold 330 of FIG. 3) and a maximum number of propagation signals received from the corresponding base station to be reported.

Means for performing the functionality at block 1302 may comprise software and/or hardware components of the device, such as the bus 1505, processing unit(s) 1510, DSP 1520, wireless communication interface 1530, memory 1560, and/or other components of the device 1500 illustrated in FIG. 15 and described in more detail below.

At block 1304, the functionality comprises determining, based on the signaling information, a power and time delay profile for the one or more reference signals, the one or more reference signals received from one or more base stations, wherein the power and time delay profile for each of the one or more reference signals comprises power and time delay information for each of one or more propagation signals corresponding to the respective reference signal. In an example (block 1305), a base station transmits a reference signal to the device. Due to possible multipath propagations, the device receives one or more propagation signals from the base station, each of which corresponds to the reception of the reference signal along a propagation path. Depending on the physical environment, one propagation signal can be the reference signal received along a line of sight path. Another propagation signal can be a reflection of the reference signal received long a reflection path. Similar (block 1307), a second base station (and other ones too) can transmit a second reference signal. The power and time delay profile identifies an absolute power and an absolute time delay per reference signal received from a base station. In particular, the functionality at block 1306 includes the device determining a first propagation signal of a first plurality of propagation signals received from the first base station (block 1305), where the first propagation signal has the strongest absolute power among the first plurality of propagation signals (block 1310), determining an absolute time delay of the first propagation signal (e.g. as a sum of the propagation delay, delay internal to the device's model, and accumulated timing advance commands) (block 1312), and including the strongest absolute power and the absolute time delay in the report (block 1314). In addition and depending on the physical environment, the report indicates for a first propagation signal that corresponds to a line of sight transmission of the reference signal from the base station and a second propagation signal that corresponds to a reflection of the first reference signal that (i) a first absolute power of the first propagation signal is larger than a second absolute power of the second propagation signal, and (ii) a first absolute time delay of the first propagation signal is smaller than a second absolute time delay of the second propagation signal. Alternatively or additionally, the report indicates for the first propagation signal and the second propagation signal corresponding to a reference signal, (i) a power difference between the first propagation signal and the second propagation signal, and (ii) a relative time delay between the first propagation signal and the second propagation signal, where the first propagation signal has a stronger absolute power that the second propagation signal, and where the report further indicates the stronger absolute power and the absolute time delay of the first propagation signal.

As described herein above in FIGS. 8-10, the device can send a single report that includes the power delay profiles of the different reference signals received from multiple base stations or can send a report per power delay profile (e.g., a report per base station). In the former case, the functionality at block 1306 comprises the device including, in the report and based on the signaling information, a second power and time delay profile that corresponds to a second plurality of propagation signals received from the second base station (block 1307) (e.g., corresponding to a second reference signal transmitted by the second base station). In the latter case, the functionality at block 1306 comprises generating a second report based on the signaling information (if one signaling information was received for all base stations) or on second signaling information (if one signaling information was received per base station), where the second report comprises a second power and time delay for second plurality of propagation signals received from the second base station.

Means for performing the functionality at block 1304 may comprise software and/or hardware components of the device, such as the bus 1505, processing unit(s) 1510, DSP 1520, wireless communication interface 1530, memory 1560, and/or other components of the device 1500 illustrated in FIG. 15 and described in more detail below.

At block 1306, the functionality comprises sending a report to the network entity, wherein the report includes the power and time delay profile. A position of the device is determined by the network entity based on the report. Additionally or alternatively, the UE can determine the position based on the report and, optionally, based on assistance information, where the assistance information can be received from the network entity based on the report. If a second report was generated (one specific to the second reference signal, or equivalently, to the second base station), the functionality at block 1308 further comprises transmitting the second report to the network entity, where the position of the device is further determined based on the second report.

Means for performing the functionality at block 1306 may comprise software and/or hardware components of the device, such as the bus 1505, processing unit(s) 1510, DSP 1520, wireless communication interface 1530, memory 1560, and/or other components of the device 1500 illustrated in FIG. 15 and described in more detail below.

As described herein above in connection with FIG. 11, the device can receive beam information and sensor output of base stations and send them to the network entity. Accordingly, the functionality of the method can further include receiving, from the base station, beam information associated with the transmission of the reference signal by the base station (block 1320), and transmitting the beam information to the network entity, where the position of the device is further determined by the network entity (or by the device) based on the beam information (block 1322). The functionality can also include receiving, from a sensor associated with the base station, sensor information associated with a sensing of the user equipment by the sensor, and transmitting the sensor information to the network entity, where the position of the device is further determined by the network entity (or the device) based on the sensor information.

In this case, the position of the device is further determined by the network entity (or the device) based on a fusion algorithm having inputs that comprise the report, the beam information, and the sensor information. In an example, the fusion algorithm selects, per base station, a reference signal received from the base station based on a corresponding power and a corresponding time delay of the reference signal from the report. In another example, the fusion algorithm selects, per base station, a reference signal received from base station based on at least one of the beam information or the sensor information. In yet another example, the fusion algorithm selects, per base station, a reference signal received from the base station and determines a weight for a selected reference signal based on a corresponding power of the selected propagation from the report, where the position of the device is further determined by the network entity (or the device) based on weights of selected propagations.

Figure 14:
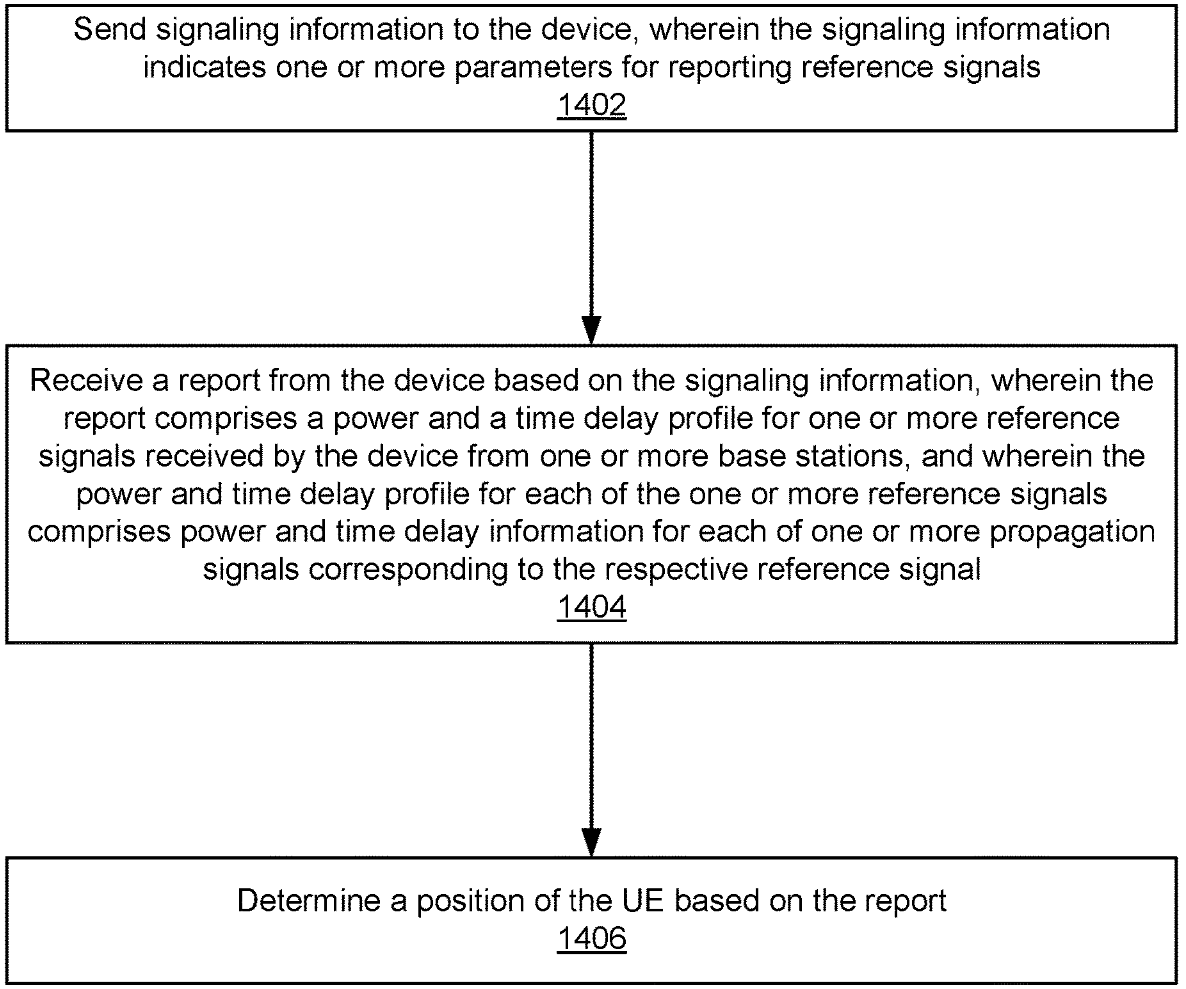
FIG. 14 is a flow diagram illustrating an example of a method of determining a position of a UE, according to an embodiment.

FIG. 14 is a flow diagram illustrating an example of a method of determining a position of a device, according to an embodiment. The method may represent a method implemented by a network entity for positioning a device. The network entity can be a base station, a location server, another UE, or another component of a cellular network. As such, the functionality shown in the blocks of FIG. 14 may be performed by the network entity. Further, means for performing the functionality may include hardware and/or software components of the network entity 1600 illustrated in FIG. 16. Additionally, it can be noted that, as with other figures appended hereto, FIG. 14 is provided as a non-limiting example. Other embodiments may vary, depending on desired functionality. For example, the functional blocks illustrated in the method may be combined, separated, or rearranged to accommodate different embodiments.

At block 1402, the functionality comprises sending signaling information to the device, wherein the signaling information indicates one or more parameters for reporting on reference signals. In an example, the network entity sends signaling information for all of the base stations that are in communication with the device (e.g., within an RF range of the device), as in the illustration of FIG. 6. In this example, the one or more parameters identify the one or more base stations base stations for which power and time delay measurements are to be included in the report. The one or more parameters further identify a power threshold associated with reporting power and time delay measurements per base station, where a first power and a first time delay of a first propagation signal are included in the report upon a determination that the first power exceeds the power threshold. In addition, the one or more parameters further identify a maximum number of propagation signals to be measured per base station, where the report comprises a total number of power measurements per base station equal to or less than the maximum number. In an illustration, the one or more parameters include a list of cells and/or RRH to measure PTDP (including QCL indication per cell), a power threshold of reported taps in the PTDP (e.g., the power threshold 330 of FIG. 3), and a maximum number of propagation signals per base station to be reported. In another example, the network entity is the base station and sends signaling information specific to the base station, as in the illustration of FIG. 7. The device also receives the applicable signaling information from each of the other base stations (e.g., a second signaling information of a second base station). Here, the signaling information per base station can include, for instance, a power threshold of reported taps in the PTDP (e.g., the power threshold 330 of FIG. 3) and a maximum number of propagation signals to be reported.

Means for performing the functionality at block 1402 may comprise software and/or hardware components of the network entity, such as the bus 1605, processing unit(s) 1610, DSP 1620, wireless communication interface 1630, memory 1660, and/or other components of the network entity 1600 illustrated in FIG. 16 and described in more detail below.

At block 1404, the functionality comprises receiving a report from the device based on the signaling information, wherein the report comprises a power and a time delay profile for one or more reference signals received by the device from one or more base stations, and wherein the power and time delay profile for each of the one or more reference signals comprises power and time delay information for each of one or more propagation signals corresponding to the respective reference signal. In an example, the report includes a power and time delay profile of the reference signal. For instance, the power and time delay profile identifies an absolute power and an absolute time delay per reference signal received by the device from a base station. In addition and depending on the physical environment, the report indicates for a first propagation signal that corresponds to a line of sight transmission from the base station and a second propagation signal that corresponds to a reflection of the first reference signal that (i) a first absolute power of the first propagation signal is larger than a second absolute power of the second propagation signal, and (ii) a first absolute time delay of the first propagation signal is smaller than a second absolute time delay of the second propagation signal. Alternatively or additionally, the report indicates for a first propagation signal and a second propagation received from a base station (i) a power difference between the first propagation signal and the second propagation signal, and (ii) a relative time delay between the first propagation signal and the second propagation signal, where the first propagation signal has the strongest absolute power, and where the report further indicates the strongest absolute power and the absolute time delay of the first propagation signal.

As described herein above in FIGS. 8-10, the device can send a single report that includes the power and time delay profiles of the different reference signals transmitted by the different base station or can send a report per power time delay profile. In the former case, the functionality at block 1404 comprises the network entity receiving the report common to all the base stations, where the report the report further comprises a second power and time delay profile that corresponds to a second plurality of propagation signals corresponding to a second reference signal received by the device from a second base station upon a second transmission of the second reference signal by the second base station. In the latter case, the functionality at block 1404 comprises receiving a second report from the device, where the second report comprises a second power and time delay profile that corresponds to a second plurality of propagation signals received from a second base station upon a transmission of the second reference signal by the second base station, and where the position of the device is further determined based on the second report.

Means for performing the functionality at block 1404 may comprise software and/or hardware components of the network entity, such as the bus 1605, processing unit(s) 1610, DSP 1620, wireless communication interface 1630, memory 1660, and/or other components of the network entity 1600 illustrated in FIG. 16 and described in more detail below.

At block 1406, the functionality comprises determining a position of the device based on the report. In an example, the network entity uses the report only (or the various received reports only) to derive the position of the device based on a multilateration estimation. In another example, the network entity uses additional types of information, such as beam information and sensor output, to derive the position based on a fusion algorithm.

In the latter example, the functionality of the method further comprises receiving, from the base station or the device, beam information associated with the transmission of the reference signal by the base station, where the position of the device is further determined based on the beam information. The functionality further comprises receiving, from the base station or the device, sensor information associated with a sensing of the user equipment by a sensor associated with the base station, where the position of the device is further determined by the network entity based on the sensor information.

The position of the device is further determined based on the fusion algorithm having inputs that comprise the report, the beam information, and the sensor information. In an example, the fusion algorithm selects a reference signal per base station based on a corresponding power and a corresponding time delay of the propagation from the report. In another example, the fusion algorithm selects a reference signal per base station based on at least one of the beam information or the sensor information. In yet another example, the fusion algorithm selects a reference signal per base station and determines a weight for a selected reference signal based on a corresponding power of the selected reference signal from the report, where the position of the device is further determined by the network entity based on weights of selected reference signals.

Means for performing the functionality at block 1406 may comprise software and/or hardware components of the network entity, such as the bus 1605, processing unit(s) 1610, DSP 1620, wireless communication interface 1630, memory 1660, and/or other components of the network entity 1600 illustrated in FIG. 16 and described in more detail below.

Figure 15:
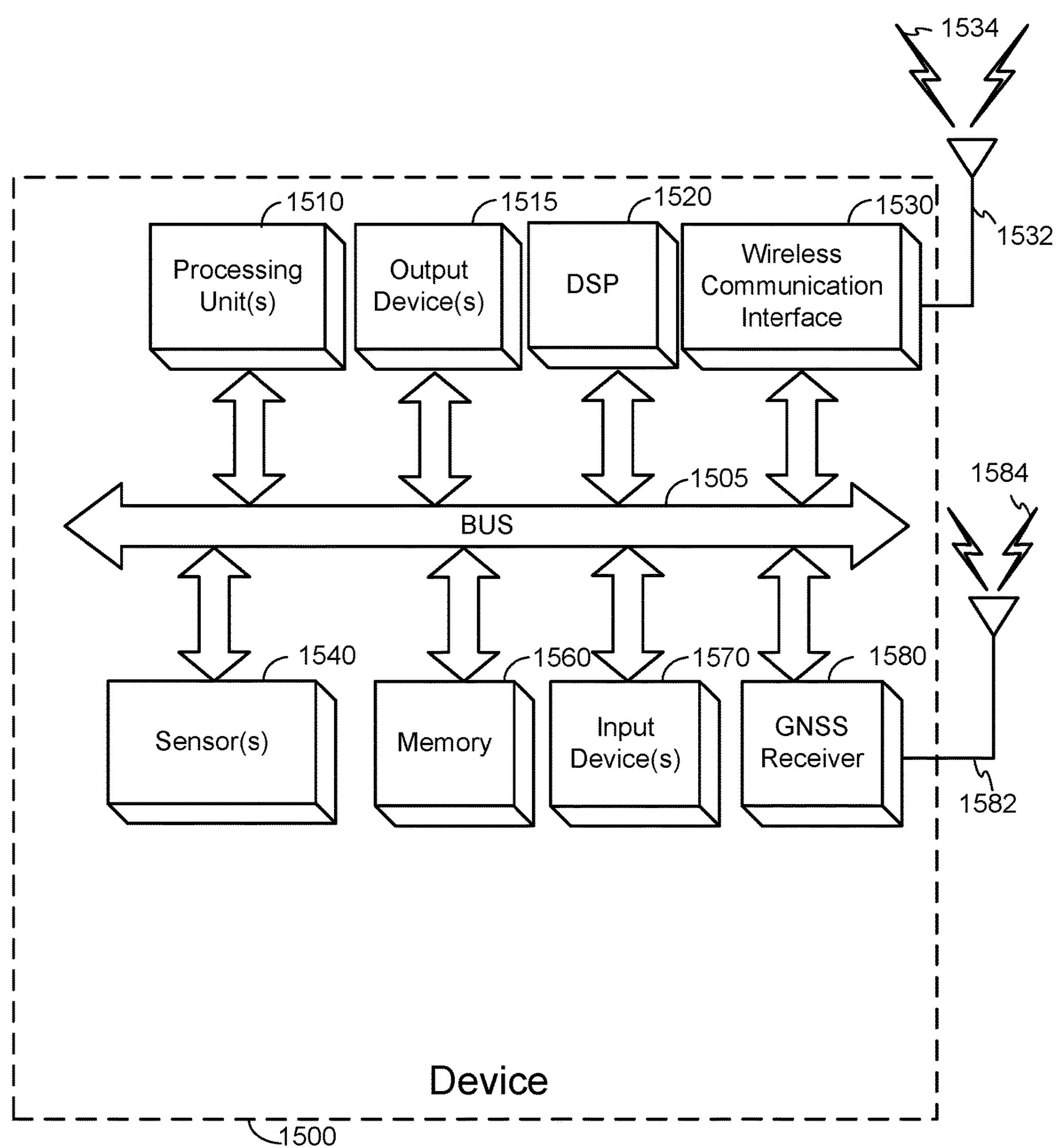
FIG. 15 is block diagram of an embodiment of a UE.

FIG. 15 is a block diagram of an embodiment of a device 1500, which can be utilized as described in the embodiments described herein and in association with FIGS. 1-14. Specifically, the device 1500 of FIG. 15 may correspond any type of device discussed in the embodiments above, including the UE 120 of FIG. 1 (and other UEs and/or mobile devices described herein). It should be noted that FIG. 15 is meant only to provide a generalized illustration of various components of device 1500, any or all of which may be utilized as appropriate.

The device 1500 is shown comprising hardware elements that can be electrically coupled via a bus 1505 (or may otherwise be in communication, as appropriate). The hardware elements may include one or more processing units 1510 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 15, some embodiments may have a separate DSP 1520, depending on desired functionality. The device 1500 also may comprise one or more input devices 1570, which may comprise without limitation one or more touch screens, touch pads, microphones, buttons, dials, switches, and/or the like; and one or more output devices 1515, which may comprise, without limitation, one or more displays, light emitting diodes (LEDs), speakers, and/or the like.

The device 1500 might also include a wireless communication interface 1530, which may comprise without limitation a modem, a network card, an infrared communication device, a wireless communication device, and/or a chipset (such as a Bluetooth® device, an IEEE 1502.11 device, an IEEE 1502.15.4 device, a Wi-Fi device, a WiMAX™ device, cellular communication facilities, etc.), and/or the like, which may enable the device 1500 to communicate via the networks (e.g., via a base station) described herein with regard to FIG. 1. The wireless communication interface 1530 may permit data to be communicated with a network, base stations (e.g., eNBs, ng-eNBs, and/or gNBs), and/or other TRPs, network components, computer systems, and/or any other electronic devices described herein. The communication can be carried out via one or more wireless communication antenna(s) 1532 that send and/or receive wireless signals 1534.

Depending on desired functionality, the wireless communication interface 1530 may comprise separate base stations to communicate with base stations (e.g., eNBs, ng-eNBs and/or gNBs) and other terrestrial base stations, such as wireless devices and access points. The device 1500 may communicate with different data networks that may comprise various network types. For example, a WWAN may be a CDMA network, a TDMA network, a FDMA network, an Orthogonal Frequency Division Multiple Access (OFDMA) network, a Single-Carrier Frequency Division Multiple Access (SC-FDMA) network, a WiMax (IEEE 1502.16), and so on. A CDMA network may implement one or more RATs such as cdma2000, W-CDMA, and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, NR and so on. 5G, LTE, LTE Advanced, NR, GSM, and WCDMA are described in documents from 3GPP. Cdma2000 is described in documents from a consortium named “3rd Generation Partnership Project 2” (3GPP2). 3GPP and 3GPP2 documents are publicly available. A wireless local area network (WLAN) may also be an IEEE 802.11x network, and a wireless personal area network (WPAN) may be a Bluetooth® network, an IEEE 802.15x, or some other type of network. The techniques described herein may also be used for any combination of WWAN, WLAN and/or WPAN.

The device 1500 can further include sensor(s) 1540. Such sensors may comprise, without limitation, one or more inertial sensors (e.g., accelerometer(s), gyroscope(s), and or other Inertial Measurement Units (IMUs)), camera(s), magnetometer(s), compass, altimeter(s), microphone(s), proximity sensor(s), light sensor(s), barometer, and the like, some of which may be used to complement and/or facilitate the functionality described herein.

Embodiments of the device 1500 may also include a Global Navigation Satellite System (GNSS) receiver 1580 capable of receiving signals 1584 from one or more GNSS satellites using an GNSS antenna 1582 (which may be combined in some implementations with antenna(s) 1532). Such positioning can be utilized to complement and/or incorporate the techniques described herein. The GNSS receiver 1580 can extract a position of the device 1500, using conventional techniques, from GNSS satellites of an GNSS system, such as Global Positioning System (GPS), Galileo, GLObal NAvigation Satellite System (GLONASS), Compass, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1580 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The device 1500 may further include and/or be in communication with one or more memories including a memory 1560. The memory 1560 may comprise, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1560 of the device 1500 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the device 1500 (e.g., using processing unit(s) 1510). In an aspect, then, such code and/or instructions can be used to configure and/or adapt a general purpose computer (or other device) to perform one or more operations in accordance with the described methods.

Figure 16:
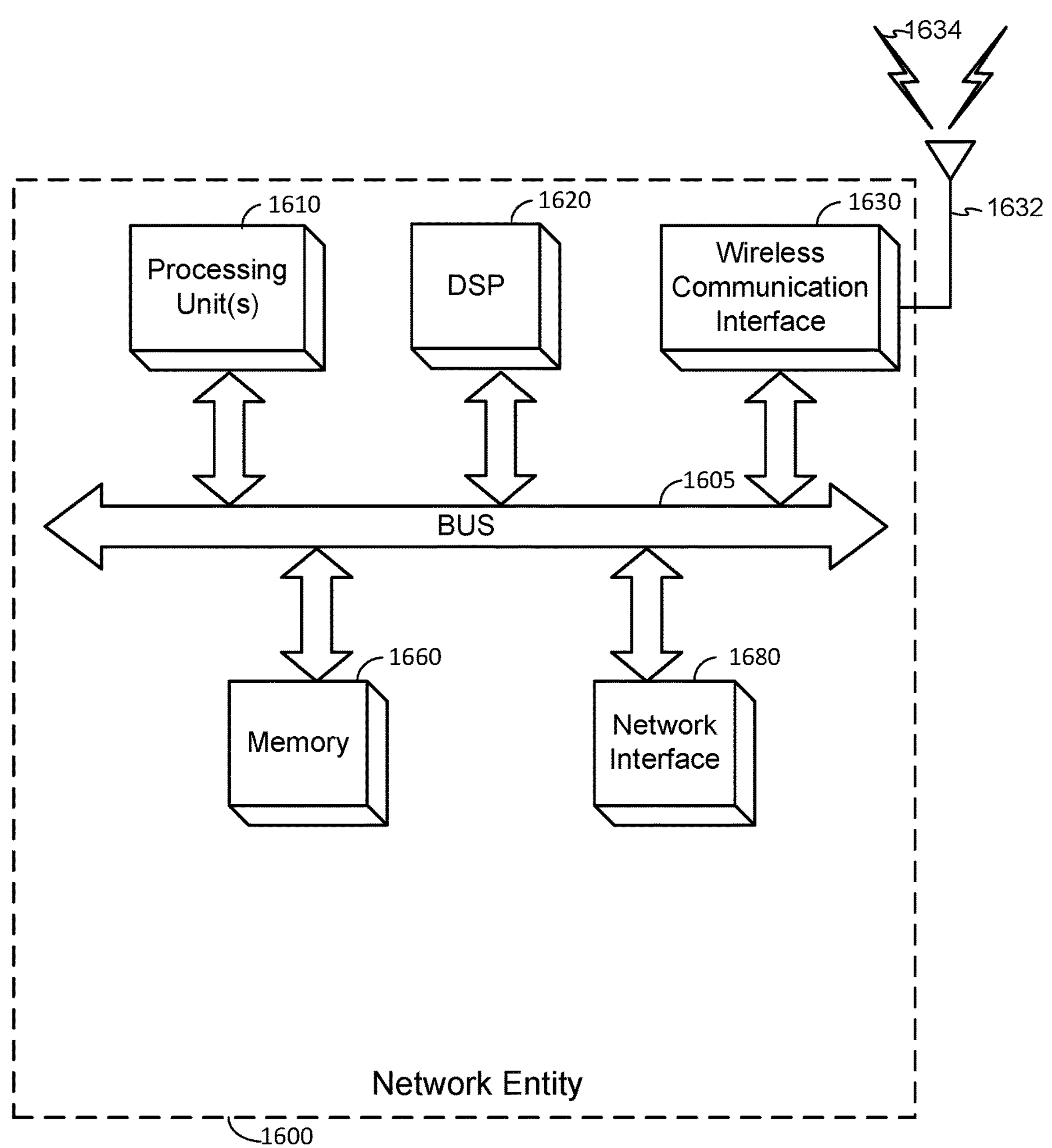
FIG. 16 is block diagram of an embodiment of a base station.

FIG. 16 illustrates an embodiment of a network entity 1600, which can be utilized as described herein above. It should be noted that FIG. 16 is meant only to provide a generalized illustration of various components, any or all of which may be utilized as appropriate. In some embodiments, the network entity 1600 may correspond to a gNB, an ng-eNB, an eNB, and/or a location server. As such, the network entity may or may not have a wireless communication interface 1630 as illustrated in FIG. 16.

The network entity 1600 is shown comprising hardware elements that can be electrically coupled via a bus 1605 (or may otherwise be in communication, as appropriate). The hardware elements may include a processing unit(s) 1610 which can include without limitation one or more general-purpose processors, one or more special-purpose processors (such as DSP chips, graphics acceleration processors, ASICs, and/or the like), and/or other processing structure or means. As shown in FIG. 16, some embodiments may have a separate DSP 1620, depending on desired functionality. Location determination and/or other determinations based on wireless communication may be provided in the processing unit(s) 1610 and/or wireless communication interface 1630 (discussed below), according to some embodiments. The network entity 1600 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The network entity 1600 might also include a wireless communication interface 1630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the network entity 1600 to communicate as described herein. The wireless communication interface 1630 may permit data and signaling to be communicated (e.g. transmitted and received) devices, other base stations (e.g., eNBs, gNBs, and ng-eNBs), and/or other TRPs, network components, computer systems, and/or any other electronic devices described herein. The communication can be carried out via one or more wireless communication antenna(s) 1632 that send and/or receive wireless signals 1634.

The network entity 1600 may also include a network interface 1680, which can include support of wireline communication technologies. The network interface 1680 may include a modem, network card, chipset, and/or the like. The network interface 1680 may include one or more input and/or output communication interfaces to permit data to be exchanged with a network, communication network servers, computer systems, and/or any other electronic devices described herein.

In many embodiments, the network entity 1600 may further comprise a memory 1660. The memory 1660 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1660 of the network entity 1600 also may comprise software elements (not shown in FIG. 16), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1660 that are executable by the network entity 1600 (and/or processing unit(s) 1610 or DSP 1620 within network entity 1600). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), an erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms "and" and "or" as used herein may include a variety of meanings that also are expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description, embodiments may include different combinations of features. Implementation examples are described in the following numbered clauses:

Clause 1. A method for reporting positioning-related information to a network entity, the method comprising: receiving signaling information indicating one or more parameters for reporting on reference signals, wherein the one or more parameters identify one or more base stations; determining, based on the signaling information, a power and time delay profile for one or more reference signals received from the one or more base stations, wherein the power and time delay profile for each of the one or more reference signals comprises power and time delay information for each of one or more propagation signals corresponding to the respective reference signal; and sending a report to the network entity, wherein the report includes the power and time delay profile.

Clause 2. The method of clause 1, wherein: the one or more parameters further identify a power threshold associated with reporting power and time delay measurements per reference signal; and a first power and a first time delay of a first reference signal are included in the report upon a determination that the first power exceeds the power threshold.

Clause 3. The method of any of clauses 1-2 wherein the one or more parameters further identify a maximum number of propagation signals to be measured per base station; and the report comprises a total number of power measurements per base station equal to or less than the maximum number.

Clause 4. The method of any of clauses 1-3 wherein the signaling information is received from the network entity; the report is sent to the network entity; and a position of a device is determined by the network entity based on the report.

Clause 5. The method of any of clauses 1-4 wherein the report indicates for a first propagation signal and a second propagation signal corresponding to a reference signal, of the one or more reference signals, received from a base station, (i) a power difference between the first propagation signal and the second propagation signal, and (ii) a relative time delay between the first propagation signal and the second propagation signal.

Clause 6. The method of any of clauses 1-5 further comprising determining a first propagation signal that has a strongest absolute power among propagation signals received from a base station; determining an absolute time delay of the first propagation signal; and including the strongest absolute power and the absolute time delay in the report.

Clause 7. The method of any of clauses 1-6 further comprising receiving, from a first base station, a first plurality of propagation signals corresponding to a first reference signal of the one or more reference signals; receiving, from a second base station, a second plurality of propagation signals corresponding to a second reference signal of the one or more reference signals; and including, in the report and based on the signaling information, a first power and time delay profile that corresponds to the first plurality of propagation signals and a second power and time delay profile that corresponds to the second plurality of propagation signals.

Clause 8. The method of any of clauses 1-6 further comprising receiving, from a first base station, a first plurality of propagation signals corresponding to a first reference signal of the one or more reference signals; receiving, from a second base station, a second plurality of propagation signals corresponding to a second reference signal of the one or more reference signals; and sending a first report that includes a first power and time delay profile that corresponds to the first plurality of propagation signals; and sending a second report that includes a second power and time delay profile that corresponds to the second plurality of propagation signals.

Clause 9. The method of any of clauses 1-8 wherein the report is sent to the network entity, to the method further comprising: receiving, from a base station, beam information associated with a reference signal, of the one or more reference signals, received from the base station; and sending the beam information to the network entity, wherein a position of a device is determined by the network entity based on the beam information and the report.

Clause 10. A method for positioning a device, the method comprising: sending signaling information to the device, wherein the signaling information indicates one or more parameters for reporting on reference signals; receiving a report from the device based on the signaling information, wherein the report comprises a power and time delay profile for one or more reference signals received by the device from one or more base stations, and wherein the power and time delay profile for each of the one or more reference signals comprises power and time delay information for each of one or more propagation signals corresponding to the respective reference signal; and determining a position of the device based on the report.

Clause 11. The method of clause 10, wherein the one or more parameters identify the one or more base stations for which power and time delay measurements are to be included in the report.

Clause 12. The method of any of clauses 10-11 wherein the one or more parameters further identify a power threshold associated with reporting power and time delay measurements for each reference signal, wherein a first power and a first time delay of a first reference signal are included in the report upon a determination that the first power exceeds the power threshold.

Clause 13. The method of any of clauses 10-12 wherein the report includes a power and time delay profile for each reference signal, of the one or more reference signals, received from a base station.

Clause 14. The method of any of clauses 10-13 wherein the report indicates for a first propagation signal and a second propagation signal corresponding to a reference signal, of the one or more reference signals, received by the device from a base station (i) a power difference between the first propagation signal and the second propagation signal and (ii) a relative time delay between the first propagation signal and the second propagation signal.

Clause 15. The method of any of clauses 10-14 further comprising receiving, from a base station or the device, beam information associated with a transmission of a reference signal by the base station to the device, wherein the position of the device is further determined based on the beam information.

Clause 16. A device for reporting positioning-related information to a network entity, the device comprising: a transceiver; one or more memories; and one or more processors communicatively coupled with the transceiver and the one or more memories, the one or more processors configured to: receive signaling information indicating one or more parameters for reporting on reference signals, wherein the one or more parameters identify one or more base stations; determine, based on the signaling information, a power and time delay profile for one or more reference signals received via the transceiver from the one or more base stations, wherein the power and time delay profile for each of the one or more reference signals comprises power and time delay information for each of one or more propagation signals corresponding to the respective reference signal; and send a report to the network entity via the transceiver, wherein the report includes the power and time delay profile.

Clause 17. The device of clause 16, wherein: the one or more parameters further identify a power threshold associated with reporting power and time delay measurements per reference signal; and a first power and a first time delay of a first reference signal are included in the report upon a determination that the first power exceeds the power threshold.

Clause 18. The device of any of clauses 16-17 wherein the one or more parameters further identify a maximum number of propagation signals to be measured per base station; and the report comprises a total number of power measurements per base station equal to or less than the maximum number.

Clause 19. The device of any of clauses 16-18 wherein the signaling information is received from the network entity; the report is sent to the network entity; and a position of the device is determined by the network entity based on the report.

Clause 20. The device of any of clauses 16-19 wherein the report indicates for a first propagation signal and a second propagation signal corresponding to a reference signal, of the one or more reference signals, received from a base station, (i) a power difference between the first propagation signal and the second propagation signal, and (ii) a relative time delay between the first propagation signal and the second propagation signal.

Clause 21. The device of any of clauses 16-20 wherein the one or more processors are further configured to: determine a first propagation signal that has a strongest absolute power among propagation signals received from a base station; determine an absolute time delay of the first propagation signal; and include the strongest absolute power and the absolute time delay in the report.

Clause 22. The device of any of clauses 16-21 wherein the one or more processors are further configured to: receive, from a first base station, a first plurality of propagation signals corresponding to a first reference signal of the one or more reference signals; receive, from a second base station, a second plurality of propagation signals corresponding to a second reference signal of the one or more reference signals; and include, in the report and based on the signaling information, a first power and time delay profile that corresponds to the first plurality of propagation signals and a second power and time delay profile that corresponds to the second plurality of propagation signals.

Clause 23. The device of any of clauses 16-21 wherein the one or more processors are further configured to: receive, from a first base station, a first plurality of propagation signals corresponding to a first reference signal of the one or more reference signals; receive, from a second base station, a second plurality of propagation signals corresponding to a second reference signal of the one or more reference signals; and transmit a first report that includes a first power and time delay profile that corresponds to the first plurality of propagation signals; and transmit a second report that includes a second power and time delay profile that corresponds to the second plurality of propagation signals.

Clause 24. The device of any of clauses 16-23 wherein the report is transmitted to the network entity, and wherein the one or more processors are further configured to: receive, via the transceiver from a base station, beam information associated with a reference signal, of the one or more reference signals, received from the base station; and transmit the beam information to the network entity, wherein a position of the device is determined by the network entity based on the beam information and the report.

Clause 25. A network entity for positioning a device, the network entity comprising: a transceiver; one or more memories; and one or more processors communicatively coupled with the transceiver and the one or more memories, the one or more processors configured to: send signaling information to the device via the transceiver, wherein the signaling information indicates one or more parameters for reporting on reference signals; receive a report from the device based on the signaling information, wherein the report comprises a power and time delay profile for one or more reference signals received by the device from one or more base stations, and wherein the power and time delay profile for each of the one or more reference signals comprises power and time delay information for each of one or more propagation signals corresponding to the respective reference signal; and determine a position of the device based on the report.

Clause 26. The network entity of clause 25, wherein the one or more parameters identify the one or more base stations for which power and time delay measurements are to be included in the report.

Clause 27. The network entity of any of clauses 25-26 wherein the one or more parameters further identify a power threshold associated with reporting power and time delay measurements for each reference signal, wherein a first power and a first time delay of a first reference signal are included in the report upon a determination that the first power exceeds the power threshold.

Clause 28. The network entity of any of clauses 25-27 wherein the report includes a power and time delay profile for each reference signal, of the one or more reference signals, received from a base station.

Clause 29. The network entity of any of clauses 25-28 wherein the report indicates for a first propagation signal and a second propagation signal corresponding to a reference signal, of the one or more reference signals, received by the device from a base station (i) a power difference between the first propagation signal and the second propagation signal and (ii) a relative time delay between the first propagation signal and the second propagation signal.

Clause 30. The network entity of any of clauses 25-29 wherein the one or more processors are further configured to: receive, from a base station or the device, beam information associated with a transmission of a reference signal by the base station to the device, wherein the position of the device is further determined based on the beam information.

What is claimed is:

1. A method for reporting positioning-related information to a network entity, the method comprising:

receiving signaling information indicating one or more parameters for reporting on reference signals, wherein the one or more parameters identify one or more base stations;

receiving, from a first base station, a first plurality of propagation signals corresponding to a first reference signal;

receiving, from a second base station, a second plurality of propagation signals corresponding to a second reference signal;

determining, based on the signaling information, a power and time delay profile for each of the first and second reference signals, wherein the power and time delay profile for the first reference signal comprises power and time delay information for each propagation signal of the first plurality of propagation signals, and the power and time delay profile for the second reference signal comprises power and time delay information for each propagation signal of the second plurality of propagation signals; and sending a report to the network entity, wherein:

the report includes the power and time delay profile for the first reference signal and the power and time delay profile for the second reference signal, or the report comprises a first report that includes the power and time delay profile for the first reference signal, and the method further comprises sending a second report that includes the power and time delay profile for the second reference signal.

2. The method of claim 1, wherein:

the one or more parameters further identify a power threshold associated with reporting power and time delay measurements per reference signal; and the power and time delay profile for the first reference signal is included in the report upon a determination that a first power of the first plurality of propagation signals exceeds the power threshold.

3. The method of claim 2, wherein:

the one or more parameters further identify a maximum number of propagation signals to be measured per base station; and the report comprises a total number of power measurements per base station equal to or less than the maximum number.

4. The method of claim 1, wherein:

the signaling information is received from the network entity;

the report is sent to the network entity; and a position of a device is determined by the network entity based on the report.

5. The method of claim 1, wherein the report indicates, for a first propagation signal and a second propagation signal of the first plurality of propagation signals, (i) a power difference between the first propagation signal and the second propagation signal, and (ii) a relative time delay between the first propagation signal and the second propagation signal.

6. The method of claim 1, further comprising:

determining a first propagation signal of the first plurality of propagation signals that has a strongest absolute power among the first plurality of propagation signals;

determining an absolute time delay of the first propagation signal; and including the strongest absolute power and the absolute time delay in the report.

7. The method of claim 1, wherein the report is sent to the network entity, to the method further comprising:

receiving, from a base station, beam information associated with the first reference signal; and sending the beam information to the network entity, wherein a position of a device is determined by the network entity based on the beam information and the report.

8. A method for positioning a device, the method comprising:

sending signaling information to the device, wherein the signaling information indicates one or more parameters for reporting on reference signals;

receiving a report from the device based on the signaling information, wherein the report comprises a power and time delay profile for reference signals received by the device from one or more base stations, and wherein the power and time delay profile for each of the reference signals comprises power and time delay information for each of one or more propagation signals corresponding to the respective reference signal; and determining a position of the device based on the report; wherein:

the report includes the power and time delay profile for a first reference signal of the reference signals and the power and time delay profile for a second reference signal of the reference signals, or the report comprises a first report that includes the power and time delay profile for the first reference signal, and the method further comprises sending a second report that includes the power and time delay profile for the second reference signal of the reference signals.

9. The method of claim 8, wherein the one or more parameters identify the one or more base stations for which power and time delay measurements are to be included in the report.

10. The method of claim 9, wherein the one or more parameters further identify a power threshold associated with reporting power and time delay measurements for each reference signal, wherein the power and time delay profile for the first reference signal is included in the report upon a determination that a first power of a propagation signal corresponding to the first reference signal exceeds the power threshold.

11. The method of claim 8, wherein the report includes a power and time delay profile for each of the reference signals received from a base station.

12. The method of claim 8, wherein the report indicates, for a first propagation signal and a second propagation signal corresponding to the first reference signal, (i) a power difference between the first propagation signal and the second propagation signal and (ii) a relative time delay between the first propagation signal and the second propagation signal.

13. The method of claim 8, further comprising receiving, from a base station or the device, beam information associated with a transmission of the first reference signal, wherein the position of the device is further determined based on the beam information.

14. A device for reporting positioning-related information to a network entity, the device comprising:

a transceiver;

one or more memories; and one or more processors communicatively coupled with the transceiver and the one or more memories, the one or more processors configured to:

receive signaling information indicating one or more parameters for reporting on reference signals, wherein the one or more parameters identify one or more base stations;

receive, from a first base station of the one or more base stations, a first plurality of propagation signals corresponding to a first reference signal;

receiving, from a second base station of the one or more base stations, a second plurality of propagation signals corresponding to a second reference signal;

determine, based on the signaling information, a power and time delay profile for each of the first and second reference signals received via the transceiver, wherein the power and time delay profile for the first reference signal comprises power and time delay information for each propagation signal of the first plurality of propagation signals, and the power and time delay profile for the second reference signal comprises power and time delay information for each propagation signal of the second plurality of propagation signals; and send a report to the network entity via the transceiver, wherein:

the report includes the power and time delay profile for the first reference signal and the power and time delay profile for the second reference signal, or the report comprises a first report that includes the power and time delay profile for the first reference signal, and the one or more processors are further configured to send a second report that includes the power and time delay profile for the second reference signal.

15. The device of claim 14, wherein:

the one or more parameters further identify a power threshold associated with reporting power and time delay measurements per reference signal; and the power and time delay profile for the first reference signal is included in the report upon a determination that a first power of the first plurality of propagation signals exceeds the power threshold.

16. The device of claim 15, wherein:

the one or more parameters further identify a maximum number of propagation signals to be measured per base station; and the report comprises a total number of power measurements per base station equal to or less than the maximum number.

17. The device of claim 14, wherein:

the signaling information is received from the network entity;

the report is sent to the network entity; and a position of the device is determined by the network entity based on the report.

18. The device of claim 14, wherein the report indicates, for a first propagation signal and a second propagation signal of the first plurality of propagation signals, (i) a power difference between the first propagation signal and the second propagation signal, and (ii) a relative time delay between the first propagation signal and the second propagation signal.

19. The device of claim 14, wherein the one or more processors are further configured to:

determine a first propagation signal of the first plurality of propagation signals that has a strongest absolute power among the first plurality of propagation signals;

determine an absolute time delay of the first propagation signal; and include the strongest absolute power and the absolute time delay in the report.

20. The device of claim 14, wherein the report is transmitted to the network entity, and wherein the one or more processors are further configured to:

receive, via the transceiver from a base station, beam information associated with the first reference signal; and transmit the beam information to the network entity, wherein a position of the device is determined by the network entity based on the beam information and the report.

21. A network entity for positioning a device, the network entity comprising:

a transceiver;

one or more memories; and one or more processors communicatively coupled with the transceiver and the one or more memories, the one or more processors configured to:

send signaling information to the device via the transceiver, wherein the signaling information indicates one or more parameters for reporting on reference signals;

receive a report from the device based on the signaling information, wherein the report comprises a power and time delay profile for reference signals received by the device from one or more base stations, and wherein the power and time delay profile for each of the reference signals comprises power and time delay information for each of one or more propagation signals corresponding to the respective reference signal; and determine a position of the device based on the report; wherein:

the report includes the power and time delay profile for a first reference signal of the reference signals and the power and time delay profile for a second reference signal of the reference signals, or the report comprises a first report that includes the power and time delay profile for the first reference signal, and the one or more processors are further configured to send a second report that includes the power and time delay profile for the second reference signal of the reference signals.

22. The network entity of claim 21, wherein the one or more parameters identify the one or more base stations for which power and time delay measurements are to be included in the report.

23. The network entity of claim 22, wherein the one or more parameters further identify a power threshold associated with reporting power and time delay measurements for each reference signal, wherein the power and time delay profile for the first reference signal is included in the report upon a determination that a first power of a propagation signal corresponding to the first reference signal exceeds the power threshold.

24. The network entity of claim 21, wherein the report includes a power and time delay profile for each of the reference signals received from a base station.

25. The network entity of claim 21, wherein the report indicates, for a first propagation signal and a second propagation signal corresponding to the first reference signal, (i) a power difference between the first propagation signal and the second propagation signal and (ii) a relative time delay between the first propagation signal and the second propagation signal.

26. The network entity of claim 21, wherein the one or more processors are further configured to:

receive, from a base station or the device, beam information associated with a transmission of the first reference signal, wherein the position of the device is further determined based on the beam information.

* * * * *